(12) United States Patent
Pollock

(10) Patent No.: US 10,625,943 B2
(45) Date of Patent: Apr. 21, 2020

(54) COMPOSITE BELT PROFILE

(71) Applicant: SAINT-GOBAIN PERFORMANCE PLASTICS CORPORATION, Solon, OH (US)

(72) Inventor: Timothy P. Pollock, Manchester, NH (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 16/567,117

(22) Filed: Sep. 11, 2019

(65) Prior Publication Data

US 2020/0002096 A1    Jan. 2, 2020

Related U.S. Application Data

(62) Division of application No. 15/817,583, filed on Nov. 20, 2017.

(60) Provisional application No. 62/427,530, filed on Nov. 29, 2016.

(51) Int. Cl.
    *B65G 15/42*       (2006.01)
    *B65G 15/38*       (2006.01)
    *A21B 1/48*        (2006.01)

(52) U.S. Cl.
    CPC ............ *B65G 15/42* (2013.01); *B65G 15/38* (2013.01); *A21B 1/48* (2013.01); *B65G 2201/0202* (2013.01); *B65G 2812/02148* (2013.01); *B65G 2812/02198* (2013.01)

(58) Field of Classification Search
    CPC ............ B65G 15/42; B65G 2201/0202; B65G 2812/02148
    USPC ....................................................... 198/846
    See application file for complete search history.

(56) References Cited

U.S. PATENT DOCUMENTS

| | | |
|---|---|---|
| 810,510 A | 1/1906 | Robins, Jr. |
| 1,580,075 A | 4/1926 | Paine |
| 2,305,044 A | 12/1942 | Toews |
| 2,430,500 A | 11/1947 | Freedlander et al. |
| 2,514,429 A | 7/1950 | Waugh |
| 2,858,237 A | 10/1958 | Walles et al. |
| 3,109,202 A | 11/1963 | Beckadolph et al. |
| 3,123,354 A | 3/1964 | Ungerer |
| 3,156,128 A | 11/1964 | Williams |
| 3,222,237 A | 12/1965 | McKelvy |

(Continued)

FOREIGN PATENT DOCUMENTS

| | | |
|---|---|---|
| CA | 2319331 A1 | 7/1999 |
| CA | 2326099 A1 | 10/1999 |

(Continued)

OTHER PUBLICATIONS

Lightweight Belts, printed from website on Sep. 21, 2004, 3 pages <www.skellerup.co.nz> (reference initially provided pertaining to U.S. Pat. No. 6,919,122B2) ((Doc BT)).

(Continued)

*Primary Examiner* — Gene O Crawford
*Assistant Examiner* — Lester Ill Rushin
(74) *Attorney, Agent, or Firm* — Abel Schillinger, LLP; Chi Suk Kim

(57) ABSTRACT

A composite belt may include a profile, and a belt. The profile may have a strip, and nodules. The profile may be attached to the belt such that each nodule extends out from the belt. The composite belt may be included in a cooking apparatus that may also include a housing, a heat source, and a drive roller.

20 Claims, 7 Drawing Sheets

(56) References Cited

U.S. PATENT DOCUMENTS

| | | |
|---|---|---|
| 3,262,383 A | 7/1966 | Sturman |
| 3,280,847 A | 10/1966 | Chisholm et al. |
| 3,329,256 A | 7/1967 | Elgaway |
| 3,374,751 A | 3/1968 | Werner |
| 3,646,880 A | 3/1972 | Norris |
| 3,659,517 A | 5/1972 | Holen |
| 3,772,929 A | 11/1973 | Redmond, Jr. |
| 3,933,548 A | 1/1976 | Anderson, Jr. et al. |
| 3,936,554 A | 2/1976 | Squier |
| 3,938,721 A | 2/1976 | Staneck et al. |
| 3,949,733 A | 4/1976 | Miller et al. |
| 3,958,531 A | 5/1976 | Warne |
| 3,959,434 A | 5/1976 | Squier |
| 3,961,569 A | 6/1976 | Kenyon et al. |
| 3,967,720 A | 7/1976 | Arieh |
| 3,976,370 A | 8/1976 | Goel et al. |
| 3,977,265 A | 8/1976 | Worley et al. |
| 3,988,940 A | 11/1976 | Szonn et al. |
| 3,988,941 A | 11/1976 | Smith |
| 4,000,348 A | 12/1976 | Harlow |
| 4,011,766 A | 3/1977 | Waugh |
| 4,053,547 A | 10/1977 | Redmond, Jr. |
| 4,077,935 A | 3/1978 | Wszolek |
| 4,084,030 A | 4/1978 | Goodale et al. |
| 4,104,985 A | 8/1978 | Klein |
| 4,128,369 A | 12/1978 | Kemerer et al. |
| 4,143,759 A | 3/1979 | Paradis |
| 4,148,864 A | 4/1979 | Groth et al. |
| 4,151,755 A | 5/1979 | Allaben, Jr. |
| 4,162,727 A | 7/1979 | Summers |
| 4,184,589 A | 1/1980 | Habegger |
| 4,194,026 A | 3/1980 | Goodale et al. |
| 4,211,743 A | 7/1980 | Nauta et al. |
| 4,216,679 A | 8/1980 | Howerton et al. |
| 4,219,617 A | 8/1980 | Wallshein |
| 4,261,257 A | 4/1981 | Henderson et al. |
| 4,284,348 A | 8/1981 | Graswinckel |
| 4,286,509 A | 9/1981 | Miller et al. |
| 4,286,870 A | 9/1981 | Silverberg |
| 4,290,248 A | 9/1981 | Kemerer et al. |
| 4,291,617 A | 9/1981 | Miller et al. |
| 4,294,539 A | 10/1981 | Spehrley, Jr. |
| 4,305,713 A | 12/1981 | Imamura |
| 4,311,474 A | 1/1982 | Standley |
| 4,316,536 A | 2/1982 | Verbeek |
| 4,325,478 A | 4/1982 | Richard |
| 4,330,287 A | 5/1982 | Fischer |
| 4,332,576 A | 6/1982 | Stecklein et al. |
| 4,336,021 A | 6/1982 | Haines |
| 4,368,559 A | 1/1983 | Oepping et al. |
| 4,386,558 A | 6/1983 | Holman et al. |
| 4,410,314 A | 10/1983 | Miranti, Jr. et al. |
| 4,426,340 A | 1/1984 | Goller et al. |
| 4,444,094 A | 4/1984 | Baker et al. |
| 4,452,132 A | 6/1984 | Miller et al. |
| 4,465,701 A | 8/1984 | Holman et al. |
| 4,485,912 A | 12/1984 | Carmichael et al. |
| 4,488,480 A | 12/1984 | Miller et al. |
| 4,491,065 A | 1/1985 | Poulson |
| 4,502,586 A | 3/1985 | Dusel et al. |
| 4,516,485 A | 5/1985 | Miller |
| 4,523,520 A | 6/1985 | Hofmann et al. |
| D279,854 S | 7/1985 | Miller et al. |
| 4,530,276 A | 7/1985 | Miller |
| 4,551,297 A | 11/1985 | Bötcher et al. |
| 4,555,543 A | 11/1985 | Effenberger et al. |
| 4,561,348 A | 12/1985 | Halters et al. |
| 4,616,562 A | 10/1986 | Kuechler |
| 4,617,908 A | 10/1986 | Miller et al. |
| 4,642,042 A | 2/1987 | Smith |
| 4,701,340 A | 10/1987 | Bratton et al. |
| 4,720,005 A | 1/1988 | Beresinsky |
| 4,752,282 A | 6/1988 | Habegger |
| 4,754,868 A | 7/1988 | Hughes et al. |
| 4,767,389 A | 8/1988 | Habegger et al. |
| 4,770,927 A | 9/1988 | Effenberger et al. |
| 4,798,566 A | 1/1989 | Sedlacek |
| 4,800,865 A | 1/1989 | Setzer |
| 4,829,158 A | 5/1989 | Burnham |
| 4,899,872 A | 2/1990 | Hokao |
| 4,922,304 A | 5/1990 | Gilbert et al. |
| 4,943,473 A | 7/1990 | Sahatjian et al. |
| 4,951,648 A | 8/1990 | Shukla et al. |
| 4,957,199 A | 9/1990 | Wokke et al. |
| 4,962,694 A | 10/1990 | Graver |
| 5,001,970 A | 3/1991 | Graver |
| 5,007,884 A | 4/1991 | Masuda et al. |
| 5,044,264 A | 9/1991 | Forney |
| 5,061,430 A | 10/1991 | Lang |
| 5,066,352 A | 11/1991 | Albers et al. |
| 5,077,884 A | 1/1992 | Mizuno et al. |
| 5,094,791 A | 3/1992 | Nopper |
| 5,135,136 A | 8/1992 | Moone |
| 5,141,800 A | 8/1992 | Effenberger et al. |
| 5,142,125 A | 8/1992 | Fioroli et al. |
| 5,145,626 A | 9/1992 | Bastioli et al. |
| 5,194,335 A | 3/1993 | Effenberger et al. |
| 5,230,937 A | 7/1993 | Effenberger et al. |
| 5,238,748 A | 8/1993 | Effenberger et al. |
| 5,239,926 A | 8/1993 | Nubson et al. |
| 5,246,099 A | 9/1993 | Genovese |
| 5,277,104 A | 1/1994 | Colaner |
| 5,314,072 A | 5/1994 | Frankel et al. |
| 5,316,462 A | 5/1994 | Seemann |
| 5,349,424 A | 9/1994 | Dalal et al. |
| 5,357,726 A | 10/1994 | Effenberger et al. |
| 5,392,107 A | 2/1995 | Paxon et al. |
| 5,410,951 A | 5/1995 | Ledet et al. |
| 5,411,779 A | 5/1995 | Nakajima et al. |
| 5,421,450 A | 6/1995 | Kitagawa et al. |
| 5,422,458 A | 6/1995 | Simmel |
| 5,451,744 A | 9/1995 | Koopman et al. |
| 5,458,051 A | 10/1995 | Alden et al. |
| 5,458,477 A | 10/1995 | Kemerer et al. |
| 5,473,975 A | 12/1995 | Bruno et al. |
| 5,573,716 A | 11/1996 | Jacobson |
| 5,588,354 A | 12/1996 | Stuck et al. |
| 5,610,217 A | 3/1997 | Yarnell et al. |
| 5,657,853 A | 8/1997 | Pennino |
| 5,667,610 A | 9/1997 | Yoshida et al. |
| 5,673,610 A | 10/1997 | Stuck |
| 5,686,004 A | 11/1997 | Schneider |
| 5,725,427 A | 3/1998 | Koerber |
| 5,746,116 A | 5/1998 | Smith |
| 5,759,924 A | 6/1998 | Sahlin |
| 5,778,294 A | 7/1998 | Hiraoka et al. |
| 5,787,655 A | 8/1998 | Saylor, Jr. |
| 5,801,362 A | 9/1998 | Pearlman et al. |
| 5,820,726 A | 10/1998 | Yoshida et al. |
| 5,830,248 A | 11/1998 | Christianson et al. |
| 5,880,043 A | 3/1999 | Lorenz et al. |
| 5,897,818 A | 4/1999 | Lewit et al. |
| 5,904,954 A | 5/1999 | Cassat et al. |
| 5,904,972 A | 5/1999 | Tunis, III et al. |
| 5,911,307 A | 6/1999 | Kraft et al. |
| 5,916,354 A | 6/1999 | Dragt |
| 5,916,659 A | 6/1999 | Koerber et al. |
| 5,931,083 A | 8/1999 | Stanger et al. |
| 5,931,983 A | 8/1999 | Bloom |
| 5,935,376 A | 8/1999 | Fell |
| 5,960,704 A | 10/1999 | March et al. |
| 6,035,765 A | 3/2000 | Finck |
| 6,059,655 A | 5/2000 | Koerber |
| 6,139,426 A | 10/2000 | Koerber |
| 6,153,244 A | 11/2000 | Stanger et al. |
| 6,177,654 B1 | 1/2001 | Schackmuth |
| 6,180,210 B1 | 1/2001 | Debus |
| 6,194,050 B1 | 2/2001 | Koerber et al. |
| 6,239,223 B1 | 5/2001 | Effenberger et al. |
| 6,241,076 B1 | 6/2001 | Maguire |
| 6,252,201 B1 | 6/2001 | Nevarez |
| 6,294,600 B1 | 9/2001 | Takada et al. |
| 6,352,758 B1 | 3/2002 | Huang et al. |
| 6,369,360 B1 | 4/2002 | Cook |

(56) References Cited

U.S. PATENT DOCUMENTS

| | | | |
|---|---|---|---|
| 6,399,678 | B2 | 6/2002 | Frankoski et al. |
| 6,495,182 | B1 | 12/2002 | Stuck |
| 6,516,943 | B2 | 2/2003 | Engle et al. |
| 6,546,836 | B1 | 4/2003 | Denney et al. |
| 6,616,558 | B2 | 9/2003 | South |
| 6,695,135 | B1 | 2/2004 | Lapeyre |
| 6,904,615 | B2 | 6/2005 | Kobe et al. |
| 6,919,122 | B2 | 7/2005 | Keese et al. |
| 7,278,350 | B2 | 10/2007 | Keese et al. |
| 7,297,903 | B1 | 11/2007 | March et al. |
| 7,487,578 | B2 | 2/2009 | Keese et al. |
| 7,897,048 | B2 | 3/2011 | Taylor |
| 2002/0134651 | A1 | 9/2002 | Itoh |
| 2004/0048708 | A1 | 3/2004 | Nonnast et al. |
| 2004/0109986 | A1 | 6/2004 | Keese et al. |
| 2004/0154473 | A1 | 8/2004 | Keese et al. |
| 2005/0097824 | A1 | 5/2005 | Braunschweig et al. |
| 2007/0031602 | A1 | 2/2007 | Keese et al. |
| 2008/0276808 | A1 | 11/2008 | Sus et al. |
| 2009/0114101 | A1 | 5/2009 | Keese et al. |
| 2014/0017362 | A1 | 1/2014 | Nevian et al. |
| 2015/0152590 | A1 | 6/2015 | Knox et al. |
| 2017/0143026 | A1 | 5/2017 | Kodali |

FOREIGN PATENT DOCUMENTS

| | | |
|---|---|---|
| EP | 1067065 A2 | 1/2001 |
| EP | 2150479 B1 | 9/2013 |
| GB | 310394 A | 4/1929 |
| GB | 1020624 A | 2/1966 |
| GB | 1279581 A | 6/1972 |
| GB | 1402275 A | 8/1975 |
| GB | 1433204 A | 4/1976 |
| GB | 1445143 A | 8/1976 |
| GB | 1494218 A | 12/1977 |
| JP | 1081207 Y2 | 1/1996 |
| JP | 2002036361 A | 2/2002 |
| JP | 2004060783 A | 2/2004 |
| JP | 3766594 B2 | 4/2006 |
| WO | 2018102166 A1 | 6/2018 |

OTHER PUBLICATIONS

Mol Belting Company (Data sheets and price lists), 1989, 79 pages (particularly pp. 11-12, 17-18, 33, 49, 56-58, and 77) (reference initially provided pertaining to U.S. Pat. No. 6,919,122B2) ((Doc BU)).

More Conveyor Belts, J.A. Emilius & Sons, printed from website on Sep. 21, 2004, 2 pages <www.emilius.com> (reference initially provided pertaining to U.S. Pat. No. 6,919,122B2) ((Doc BV)).

NIBA: Introductory Guide to Conveyor Belting; National Industrial Belting Association; Apr. 1998, 49 pages, particularly pp. 29-30 and 41 (reference initially provided pertaining to U.S. Pat. No. 6,919,122B2) ((Doc BW)).

Deposition of Ronald Godsen—Sep. 22, 2006, 288 pages (reference initially provided pertaining to U.S. Pat. No. 6,919,122B2) ((Doc BX)).

Request for Ex Parte Reexamination of U.S. Pat. No. 6,919,122B2, Apr. 7, 2006. Exhibits B-F, H, O attached. (reference initially provided pertaining to U.S. Pat. No. 6,919,122B2) ((Doc AT)).

Decision on Appeal from U.S. Reexamination Control No. 90/008,001 (Reexamination of U.S. Pat. No. 6,919,122), dated Jun. 4, 2010, 20 pages ((Doc BY)).

Owner's Manual for Model VCT-20 Deluxe Vertical Contact Toaster, Rev C, dated May 2004, 22 pages (reference initially provided pertaining to U.S. Pat. No. 6,919,122B2) ((Doc BZ)).

Picture of contact toaster design with wrap belt, sketched Apr. 16, 1997, 1 page (reference initially provided pertaining to U.S. Pat. No. 6,919,122B2) ((Doc CA)).

Plaintiff's Opposition to Defendant's Motion to Stay Proceedings in Light of Defendant's Request for Reexamination; U. S. District Court, District of Massachusettes; Apr. 27, 2006, 21 pages (reference initially provided pertaining to U.S. Pat. No. 6,919,122B2) ((Doc CB)).

Polyurethane Timing Belts with Weld-on Profiles; BRECOflex Co., LLC; Aug. 1997, 15 pages. (reference initially provided pertaining to U.S. Pat. No. 6,919,122B2) ((Doc CC)).

Product data—Grabber, Habasit AG, Oct. 29, 2002, 5 pages (reference initially provided pertaining to U.S. Pat. No. 6,919,122B2) ((Doc CD)).

Reply in Support of Plaintiff's Motion for a Preliminary Injunction, filed Feb. 7, 2006, 11 pages (reference initially provided pertaining to U.S. Pat. No. 6,919,122B2) ((Doc CE)).

Deposition of Glenn Schackmuth—Sep. 20, 2006, 325 pages (reference initially provided pertaining to U.S. Pat. No. 6,919,122B2) ((Doc CF)).

Roundup Installation Instructions VCT-100/200 Rapid Toaster Groovy Belt Wrap, dated Aug. 1999, 2 pages (reference initially provided pertaining to U.S. Pat. No. 6,919,122B2) ((Doc CG)).

RSI News Briefs, dated Aug. 5, 2002, 1 page (reference initially provided pertaining to U.S. Pat. No. 6,919,122B2) ((Doc CH)).

Saint-Gobain Complaint, filed Dec. 23, 2005, 6 pages plus Tabs A-D (reference initially provided pertaining to U.S. Pat. No. 6,919,122B2) ((Doc CI)).

Saint-Gobain's Memorandum in Support of Plaintiff's Motion for a Preliminary Injunction, Jan. 17, 2006, 21 pages (reference initially provided pertaining to U.S. Pat. No. 6,919,122B2) ((Doc CJ)).

Siegling, Conveyor and Processing Belts Material, date unknown, 14 pages (reference initially provided pertaining to U.S. Pat. No. 6,919,122B2) ((Doc CK)).

Special Purpose Belts, Dynamic Rubbers Ltd., printed from website on Sep. 22, 2004, 2 pages <www.dynamicrubbers.com> (reference initially provided pertaining to U.S. Pat. No. 6,919,122B2) ((Doc CL)).

Sur Reply in Opposition to Plaintiff's Motion for Preliminary Injunction, filed Feb. 9, 2005, 5 pages (reference initially provided pertaining to U.S. Pat. No. 6,919,122B2) ((Doc CM)).

Urethane and Silicone Covers, Beltservice Corporation, printed from website on Sep. 22, 2004, 2 pages <www.beltservice.com> (reference initially provided pertaining to U.S. Pat. No. 6,919,122B2) ((Doc CN)).

USPTO Patent Database Search for "Silicone Rubber" or "Urethane Rubber" or "Fluoropolymer" or Fluoroplastic et al., printed from website on Sep. 22, 2004, 2 pages (reference initially provided pertaining to U.S. Pat. No. 6,919,122B2) ((Doc CO)).

USPTO Patent Database Search for "Silicone Rubber" or "Urethane Rubber" or "Fluoropolymer" or Fluoroplastic or Fluoroelastomer et al., printed from website on Sep. 22, 2004, 3 pages (reference initially provided pertaining to U.S. Pat. No. 6,919,122B2) ((Doc CP)).

USPTO Patent Database Search for "Silicone" or "Urethane Rubber" or "Fluoropolymer" or Fluoroplastic or Fluoroelastomer, printed from website on Sep. 22, 2004, 2 pages (reference initially provided pertaining to U.S. Pat. No. 6,919,122B2) ((Doc CQ)).

USPTO Patent Full-Text and Image Database Search Results for (ABST/(coat or coated) and belt) and (((rib or flight) or chevron) or cleat)), completed on Oct. 29, 2003, 10 pages. (reference initially provided pertaining to U.S. Pat. No. 6,919,122B2) ((Doc CR)).

Summons to attend oral proceedings from European Patent Application 00202394.3-2307, dated Jul. 26, 2006, 3 pages (reference initially provided pertaining to U.S. Pat. No. 6,919,122B2) ((Doc CS)).

Slim Line On-Demand Vertical Contact Toasters (297 Series), 2 pages <http://www.princecastle.com/products/toasters_297series.asp> ((Doc CT)).

A.J. Antunes—Roundup Stainless Steel Vertical Contact Toaster w/ Control Dial VCT-50, 2 pages <http://www.acitydiscount.com/A-J-Antunes-Roundup-Stainless-Steel-Vertical-Contact-Toaster-w-Control-Dial-VCT-50.0.25559.1.1.htm> ((Doc CU)).

Office Action for U.S. Appl. No. 09/608,649, dated Jan. 2, 2002, 4 pgs. ((Doc CV)).

Office Action for U.S. Appl. No. 09/608,649, dated May 17, 2002, 5 pgs. ((Doc CW)).

(56) References Cited

OTHER PUBLICATIONS

Office Action for U.S. Reexam Application No. 90/008,001 (Reexamination of U.S. Pat. No. 6,919,122) dated Feb. 12, 2007, 10 pgs. ((Doc CX)).
Office Action for U.S. Appl. No. 09/608,649, dated Dec. 27, 2002, 5 pgs. ((Doc CY)).
Office Action for U.S. Appl. No. 09/608,649, dated Apr. 21, 2004, 6 pgs. ((Doc CZ)).
Sales Report by sales person.—Bate No. 743 ((Doc DA)).
Web printoutout from St. Louis Factory Supply Inc.—Bate Nos. 785-796 ((Doc DB)).
Spreadsheet entitled "Customer Booking Detailed Report"—Bate Nos. 804-815 ((Doc DC)).
Esp@cenet results for terms "breco or derco or esbelt or sampla," Feb. 21, 2006, 2 pages.—Bates Nos. 1229-1230 ((Doc DD)).
USPTO database results for terms "siegling or habasit or albany," Feb. 16, 2006, 2 pages. Bates Nos. 1231-1232. ((Doc DE)).
USPTO database results for terms "belt corporation or derco or goodyear or ibt or industrial belting," Feb. 16, 2006, 1 page, Bates No. 1233. ((Doc DF)).
USPTO database results for terms "garlock or mectrol or nitta," Feb. 16, 2006, 1 page, Bates No. 1234. ((Doc DG)).
USPTO database results for terms "scandura or sampla or esbelt or shingle," Feb. 16, 2006, 1 page, Bates No. 1235. ((Doc DH)).
USPTO database results for terms "midwest industrial or sparks or Shepard or chiorino or siegling or habasit or albany," Feb. 16, 2006, 2 pages, Bates Nos. 1236-1237. ((Doc DI)).
USPTO database results for terms "midwest industrial or sparks or Shepard or chiorino or siegling or habasit or albany," Feb. 16, 2006, 2 pages, Bates Nos. 1238-1239. ((Doc DJ)).
USPTO database results for terms "rib or ribbed or ribs," Feb. 15, 2006, 2 pages, Bates Nos. 1240-1241. ((Doc DK)).
USPTO database results for terms "cleated or cleat or cleats," Feb. 15, 2006, 2 pages, Bates Nos. 1242-1243. ((Doc DL)).
USPTO database results for terms "chevrons or chevroned or chevron," Feb. 15, 2006, 3 pages, Bates Nos. 1244-1246. ((Doc DM)).
USPTO database results for terms "ribbed or ribs," Feb. 15, 2006, 2 pages, Bates Nos. 1247-1248. ((Doc DN)).
USPTO database results for terms "The gates rubber," Feb. 15, 2006, 1 page, Bates No. 1249. ((Doc DO)).
USPTO database results for term "4919409," Feb. 11, 2006, 1 page, Bates No. 1250. ((Doc DP)).
Esp@cenet results for terms "conveyor and profiled belt," Feb. 20, 2006, 1 page, Bates No. 1251. ((Doc DQ)).
Sp@cenet results for terms "breco or derco or esbelt or sampla," Feb. 21, 2006, 2 page, Bate No. 1252. ((Doc DR)).
Ammeraal Process and Conveyor Belting, General Information Data Sheets, 20 pages, Bates Nos. 1772-1790. ((Doc DS)).
Ammeraal Process and Conveyor Belting, Data Sheet/Structure Profiles, 18 pages, Bates Nos. 1791-1807. ((Doc DT)).
Ammeraal Bandas Transportadoras y de Proceso, 6 pages, Bates Nos. 1808-1812. ((Doc DU)).
Especificationes for Bandas Transportadoras y de proceso—ammeraal—Bate Nos. 1829-1873 ((Doc DV)).
Derco Conveyor and Process Belting specifications, 9 pages, Bates Nos. 2188-2195. ((Doc DW)).
Derco specs—Bate Nos. 2202-2210 ((Doc DX)).
Derco specs—Bate Nos. 2217-2228 ((Doc DY)).
Derco specs—Bate Nos. 2229-2234 ((Doc DZ)).
Derco specs—Bate Nos. 2237 ((Doc EA)).
Mol Belting Company—Comparison chart for Plied Thermal Plastic Belting and other documents from Mol Belting Company—Bate Nos. 2256-2270 ((Doc EB)).
Mol Belting Company, EuroTech Conveyor Belting, 8 pages, Bates Nos. 2271-2277. ((Doc EC)).
Mol Belting Company Engineering Data Sheets, 81 pages, Bates Nos. 2279-2358. ((Doc ED)).
Fabreeka Specialist Conveyor Belting Product Brochure, Bate Nos. 2359-2400 ((Doc EE)).
Introductory Guide to Conveyor Belting, published by The National Industrial Belting Association—Bate Nos. 2448-2460 ((Doc EF)).
Brecoflex, Polyurethane Timing Belts with Weld-on Profiles, 16 pages, Bates Nos. 2461-2475. ((Doc EG)).
Textbook for loading considerations, belt selection, etc.—Bate Nos. 2476-2480 ((Doc EH)).
Book chapter entitled "A Guide to Steep Angle Conveying"—Bate Nos. 2481-2500 ((Doc EI)).
Polyflex material cleating procedure fax—Bate Nos. 2516 ((Doc EJ)).
Fabreeka, The Original Thin-Ply Conveyor Belting, 5 pages, Bates Nos. 2518-2521. ((Doc EK)).
Fabreeka, The Original Thin-Ply Conveyor Belting, 5 pages, Bates Nos. 2522-2525. ((Doc EL)).
Fabreeka, Fabsyn Food-Grade Belting, 5 pages, Bates Nos. 2526-2529. ((Doc EM)).
Fabreeka, Fablon Heavy-Duty Belting, 5 pages, Bates Nos. 2530-2533. ((Doc EN)).
Chemprene brochure in Spanish (Bandas transportadoras y de proceso), 7 pages, Bates Nos. 2534-2539. ((Doc EO)).
Shingle Belting brochure—Bate Nos. 2566-2581 ((Doc EP)).
Fabreeka invoice—Bate No. 2586 ((Doc EQ)).
Esbelt brochure in Spanish (Bandas para transportadores), 7 pages, Bates Nos. 2587-2592. ((Doc ER)).
Strongbelt Brochure (published in multiple languages), 143 pages, Bates Nos. 2593-2734. ((Doc ES)).
Royalon Heavy Duty Plied Conveyor and Elevator Belting, 16 pages, Bates Nos. 2735-2749. ((Doc ET)).
Synchronous Belts Brochure, Belting Industries Co, Inc., 12 pages, Bates Nos. 2757-2767. ((Doc EU)).
Brecoflex schematic—Bates No. 2776 ((Doc EV)).
Brecoflex brochure, Metric pitches, 13 pages, Bates Nos. 2778-2789. ((Doc EW)).
Mectrol Endless Flex-Belts, 11 pages, Bates Nos. 2790-2799. ((Doc EX)).
Mectrol brochure—Bates Nos. 2806-2892 ((Doc EY)).
Schlatterer Espand brochure—Bates Nos. 2893-2923 ((Doc EZ)).
Customer Booking Reports—Bates Nos. 3009-3017 ((Doc FA)).
Introductory Guide to conveyor belting—Bates Nos. 3046-3083 ((Doc FB)).
AFC Introduces the New DuraChef Blue High Speed Vertical Toaster Conveyor Belt, Advanced Flexible Composites press release, Apr. 29, 2005, 1 pages, Bates No. 3170. ((Doc FC)).
Vade Mecum manual, Esbelt, 84 pages, Bates Nos. 3222-3304. ((Doc FD)).
Glossary of Industry Terms for the Conveyor and Elevator Belting Industry—Bates Nos. 3972-3998 ((Doc FE)).
AFC Announces Arby's Approval for DuraChef Toaster Belts and Release Sheets, Advanced Flexible Composites press release, Apr. 6, 2006, 1 page, Bates No. 3999. ((Doc FF)).
AFC Announces Supplier Approval to Burger King Corporation & Restaurant Services, Inc., Advanced Film Composites press release, Nov. 13, 2003, 1 page, Bates No. 4000. ((Doc FG)).
AFC Introduces the DuraChef Family of High Speed Vertical Toaster Conveyor Belts, Advanced Film Composites press release, Sep. 8, 2003, 2 pages, Bates Nos. 4001-4002. ((Doc FH)).
AFC Introduces the New DuraChef Blue High Speed Vertical Toaster Conveyor Belt, Advanced Flexible Composites press release, Apr. 29, 2005, 1 page, Bates No. 4003. ((Doc FI)).
List of AFC press releases—Bates Nos. 4008-4009 ((Doc FJ)).
AFC definitions of common terms—Bates Nos. 4202-4219 ((Doc FK)).
Non-Final Office Action for U.S. Appl. No. 10/796,534, dated Jul. 12, 2005, 8 pages. ((Doc FM)).
Non-Final Office Action for U.S. Appl. No. 10/796,534, dated Jan. 5, 2006, 7 pages. ((Doc FN)).
Food Handling Belts, Beltservice Corporation, 1 page. ((Doc FO)).
International Search Report and Written Opinion for PCT/US2017/062484, dated Jan. 30, 2018, 9 pages. ((Doc AA)).
Letter from Carponelli & Krug, 230 West Monroe Street, Suite 250, Chicago, IL, 60606, dated Dec. 8, 2003, regarding Pending European Patent Application EP 1-067-065 AZ (reference initially provided pertaining to U.S. Pat. No. 6,919,122B2) ((Doc AB)).

(56) References Cited

OTHER PUBLICATIONS

Letter from Carponelli & Krug, 230 West Monroe Street, Suite 250, Chicago, IL, 60606, dated Oct. 7, 2003, regarding Pending European Patent Application EP 1-067-065 AZ (reference initially provided pertaining to U.S. Pat. No. 6,919,122B2) ((Doc AC)).

Letter from Carponelli & Krug, 230 West Monroe Street, Suite 250, Chicago, IL, 60606, dated Jan. 14, 2004, regarding Pending European Patent Application EP 1-067-065 AZ (reference initially provided pertaining to U.S. Pat. No. 6,919,122B2) ((Doc AD)).

Belt Design Catalog, F.N. Sheppard & Co., 51 pages (Provided with U.S. Pat. No. 6,919,122 from which priority is claimed) ((Doc AE)).

Celloflex, HV1 foil, compound coatings, Product Catalog, BREC Zahnriemen, printed from website on Sep. 22, 2004, 2 pages <http://mulco.cadclick.de>(reference initially provided pertaining to U.S. Pat. No. 6,919,122B2) ((Doc AF)).

Chemprene HiFlex Nonwoven Belting material, date unknown, 2 pages (reference initially provided pertaining to U.S. Pat. No. 6,919,122B2) ((Doc AG)).

Chevron Cleated Belting, Beltservice Corporation, printed from website www.beltservice.com on Sep. 22, 2004, 2 pages (reference initially provided pertaining to U.S. Pat. No. 6,919,122B2) ((Doc AH)).

Chrome-Leather, Viton, Correx, Linatex, Polythan D44, Product Catalog, BREC Zahnriemen, printed from website on Sep. 22, 2004, 3 pages <http://mulco.cadclick.de> (reference initially provided pertaining to U.S. Pat. No. 6,919,122B2) ((Doc AI)).

Cleated Belting, Beltservice Corporation, printed from website on Sep. 22, 2004, 2 pages <www.beltservice.com> (reference initially provided pertaining to U.S. Pat. No. 6,919,122B2) ((Doc AJ)).

Conveyors, printed from website www.Foodex.Org.Uk on Sep. 20, 2004, 2 pages (reference initially provided pertaining to U.S. Pat. No. 6,919,122B2) ((Doc AK)).

Conveyor Belting, Goodyear Rubber Products Corp, printed from website on Sep. 21, 2004, 4 pages <www.goodyearinternational.com> (reference initially provided pertaining to U.S. Pat. No. 6,919,122B2) ((Doc AL)).

Declaration of Marcus Burch in Support of Plaintiff's Opposition to Defendant's Motion to Stay Proceedings in Light of Defendant's Request for Reexamination; U.S. District court, District of Massachusetts; Apr. 27, 2006, 5 pages (reference initially provided pertaining to U.S. Pat. No. 6,919,122B2) ((Doc AM)).

Defendant's Memorandum in Support of its Motion to Stay Proceedings Three Months Pending Grant or Denial of Request for Reexamination; U.S. District court, District of Massachusetts; Apr. 13, 2006, 12 pages (reference initially provided pertaining to U.S. Pat. No. 6,919,122B2) ((Doc AN)).

Defendant's Reply to Plaintiff's Opposition to Defendant's Motion to Stay Proceedings in Light of Defendant's Request for Reexamination; U.S. District court, District of Massachusetts; May 2, 2006, 6 pages (reference initially provided pertaining to U.S. Pat. No. 6,919,122B2) ((Doc AO)).

Defendant's Opposition to Plaintiff's Motion for Preliminary Injunction and, Alternatively, Motion to Stay Pending Decision on Transfer Motion, filed Jan. 31, 2006, 13 pages (reference initially provided pertaining to U.S. Pat. No. 6,919,122B2) ((Doc AP)).

Discussion of Other Information by Kevin C. Bauler, dated Apr. 4, 2006, 3 pages (reference initially provided pertaining to U.S. Pat. No. 6,919,122B2) ((Doc AQ)).

Elastomer Conveyor Belts, Ammeraal Beltech, Jan. 2002, 8 pages (reference initially provided pertaining to U.S. Pat. No. 6,919,122B2) ((Doc AR)).

European Patent Office Communication Pursuant to Article 96(2) EPC for EP00202394.3-2307, dated Dec. 8, 2003, 4 pages. (reference initially provided pertaining to U.S. Pat. No. 6,919,122B2) ((Doc FL)).

European Search Report for Application for EP 00 20 2394, dated Mar. 30, 2001, 2 pages (reference initially provided pertaining to U.S. Pat. No. 6,919,122B2) ((Doc AS)).

F.N. Sheppard & Co. Belting Specialties Catalog, Copyright 2000, 49 pages (reference initially provided pertaining to U.S. Pat. No. 6,919,122B2) ((Doc AU)).

Fax from Pauley, Petersen & Erikson, dated Mar. 28, 2006, 2 pages (reference initially provided pertaining to U.S. Pat. No. 6,919,122B2) ((Doc AV)).

Feb. 7, 2006 Declaration of Ruth A. Jamke, 3 pages (reference initially provided pertaining to U.S. Pat. No. 6,919,122B2) ((Doc AW)).

Furon e-mail from Neil Fitchett re: Antunes, dated Mar. 2, 1999, 1 page (reference initially provided pertaining to U.S. Pat. No. 6,919,122B2) ((Doc AX)).

Furon e-mail to Art Rogove, Re: LSR trial Jan. 22, 1999, dated Jan. 22, 1999, 2 pages (reference initially provided pertaining to U.S. Pat. No. 6,919,122B2) ((Doc AY)).

Furon Fax Cover Sheet re: A. J. Antunes—Project No. E9800547, dated Jan. 21, 1999, 1 page (reference initially provided pertaining to U.S. Pat. No. 6,919,122B2) ((Doc AZ)).

Furon Initial Product Development Request (Project E9800547), dated Jul. 29, 2008, 1 page (reference initially provided pertaining to U.S. Pat. No. 6,919,122B2) ((Doc BA)).

Furon Memorandum Re: Call report on A.J. Antunes Opportunity $400-$1000K/yr, dated Feb. 20, 1999, 2 pages (reference initially provided pertaining to U.S. Pat. No. 6,919,122B2) ((Doc BB)).

Google patent search for "+silicone+conveyor+belt+(ribs or cleats or chevrons or flighted)" et al., printed from website on Sep. 21, 2004, 1 page <www.google.com> (reference initially provided pertaining to U.S. Pat. No. 6,919,122B2) ((Doc BC)).

Google patent search for "Fluoroelastomer" or "Fluoroelastomers" or "Viton" or "Fluorel" and "Chevron" et al., printed from website on Sep. 22, 2004, 1 page <www.google.com> (reference initially provided pertaining to U.S. Pat. No. 6,919,122B2) ((Doc BD)).

Special Fabrications, Ammeraal Beltech, 6 pages, WayBack Machine (web.archive.org) used to access http://www.ammeraal-beltechusa.com/SpecialFabrications.htm as archived Dec. 3, 2003. (reference initially provided pertaining to U.S. Pat. No. 6,919,122B2) ((Doc FP)).

Who is Beltservice?, Beltservice Corporation, 1 page, WayBack Machine (web.archive.org) used to access http://www.peltservice.com/beltservice_corporate_id.html as archived on Dec. 2, 2003. (reference initially provided pertaining to U.S. Pat. No. 6,919,122B2) ((Doc FQ)).

Applications: Lightweight Belting, Chemprene, 1 page, WayBack Machine (web.archive.org) used to access http://www.chemprene.com/five.htm as archived on Oct. 12, 2003. (reference initially provided pertaining to U.S. Pat. No. 6,919,122B2) ((Doc FR)).

Fablon Cleated Belt Black Non Food Grade Multi Purpose, dated Oct. 2, 2003, 3 pages, http://www.fabreeka.com/belting/products/food/fabloncleat.html (reference initially provided pertaining to U.S. Pat. No. 6,919,122B2) ((Doc BE)).

Light Weight Belting, Scandura, 1 page, WayBack Machine (web.archive.org) used to access http://www.scandura.net/product/lightweightmain.html as archived on Oct. 12, 2003. (reference initially provided pertaining to U.S. Pat. No. 6,919,122B2) ((Doc FS)).

Polyurethane Belting, Sparks Belting Company, 3 pages, WayBack Machine (web.archive.org) used to access http://www.sparksbelting.com/polyurethane-belting.html as archived on Feb. 9, 2004. (reference initially provided pertaining to U.S. Pat. No. 6,919,122B2) ((Doc FT)).

Illustration / principle / shape of surface structure / pattern of the conveying side of Habasit conveyor and processing belts; Edition: Feb. 02/08, 1998, 6 pages (reference initially provided pertaining to U.S. Pat. No. 6,919,122B2) ((Doc BF)).

Industrial Belting, 21st Century Technologies of America, Inc., printed from website on Sep. 21, 2004, 4 pages <www.team21st.com> (reference initially provided pertaining to U.S. Pat. No. 6,919,122B2) ((Doc BG)).

Jan. 12, 2006 Declaration of Kevin C. Bauler, 6 pages plus Exhibits A-F (reference initially provided pertaining to U.S. Pat. No. 6,919,122B2)((Doc BH)).

(56) References Cited

OTHER PUBLICATIONS

Jan. 12, 2006 Declaration of Marcus A. Burch, 4 pages plus Exhibits A-K (reference initially provided pertaining to U.S. Pat. No. 6,919,122B2) ((Doc BI)).

Jan. 12, 2006 Declaration of Peter D. Spohn, 4 pages (reference initially provided pertaining to U.S. Pat. No. 6,919,122B2) ((Doc BJ)).

Jan. 16, 2006 Declaration of Ruth A. Jamke, 5 pages (reference initially provided pertaining to U.S. Pat. No. 6,919,122B2) ((Doc BK)).

Jan. 31, 2006 Declaration of Douglas H. Pauley, 4 pages plus Exhibits A-D (reference initially provided pertaining to U.S. Pat. No. 6,919,122B2) ((Doc BL)).

Jan. 31, 2006 Declaration of W. Christopher Lewis, 2 pages (reference initially provided pertaining to U.S. Pat. No. 6,919,122B2) ((Doc BM)).

Deposition Transcript of Scott March—Aug. 3, 2006 at 10:00 am, 216 pages (reference initially provided pertaining to U.S. Pat. No. 6,919,122B2) ((Doc BN)).

Deposition Transcript of Scott March—Aug. 3, 2006 at 3:42 pm, 249 pages (reference initially provided pertaining to U.S. Pat. No. 6,919,122B2) ((Doc BO)).

Office Action from European Patent Application 00202394.3-2307, dated Jun. 21, 2005, 5 pages (reference initially provided pertaining to U.S. Pat. No. 6,919,122B2) ((Doc BP)).

Letter from Carponelli & Krug, 230 West Monroe Street, Suite 250, Chicago, IL, 60606, dated Oct. 6, 2004, regarding U.S. Patent Application Pub. No. 2004/0109986/A1 (reference initially provided pertaining to U.S. Pat. No. 6,919,122B2) ((Doc BQ)).

Light Duty Conveyor Belts, Dynamic Rubbers Ltd., printed from website on Sep. 21, 2004, 3 pages <www.dynamicrubbers.com> (reference initially provided pertaining to U.S. Pat. No. 6,919,122B2) ((Doc BR)).

Light Weight Thermoplastic Belting, Beltservice Corporation, printed from website on Sep. 22, 2004, 2 pages <www.beltservice.com> (reference initially provided pertaining to U.S. Pat. No. 6,919,122B2) ((Doc BS)).

COMPOSITE BELT PROFILE

CROSS-REFERENCE TO RELATED APPLICATION

This Application is a divisional of and claims priority under 35 U.S.C. § 120 to U.S. patent application Ser. No. 15/817,583, entitled "COMPOSITE BELT PROFILE," by Timothy P. POLLOCK, filed Nov. 20, 2017, which claims priority under 35 U.S.C. § 119(e) to U.S. Provisional Patent Application No. 62/427,530, entitled "COMPOSITE BELT PROFILE," by Timothy P. POLLOCK, filed Nov. 29, 2016, both of which are assigned to the current assignee hereof and are incorporated herein by reference in their entireties.

FIELD OF THE DISCLOSURE

The present disclosure relates to a composite belt containing a profile, and more particularly, to a composite belt containing a profile for use in a cooking apparatus.

BACKGROUND

Composite belts are used in a variety of applications. The food service industry has made use of composite belts to prepare food, including passing food through a heated oven for warming or cooking. The temperature of the oven and the speed of the belt can be selected such that the food can be placed on one end of the belt, passed through the oven, and heated to the appropriate temperature upon leaving the oven. However, components of the composite belt and the oven may degrade during exposure to high heat and continuous motion, resulting in an increasing risk of contamination of food as it passes through the oven. There remains a need for composite belts which have improved performance in such applications.

SUMMARY

According to one aspect, a composite belt may include a profile, and a belt. The profile may have a strip, and nodules. The profile may be attached to the belt such that each nodule extends out from the belt.

According to still another aspect, a cooking apparatus may include a housing, a heat source, a drive roller, and a composite belt. The composite belt may include a profile, and a belt. The profile may have a strip, and nodules. The profile may be attached to the belt such that each nodule extends out from the belt.

BRIEF DESCRIPTION OF THE DRAWINGS

Embodiments are illustrated by way of example and are not limited in the accompanying figures.

Figure 1:
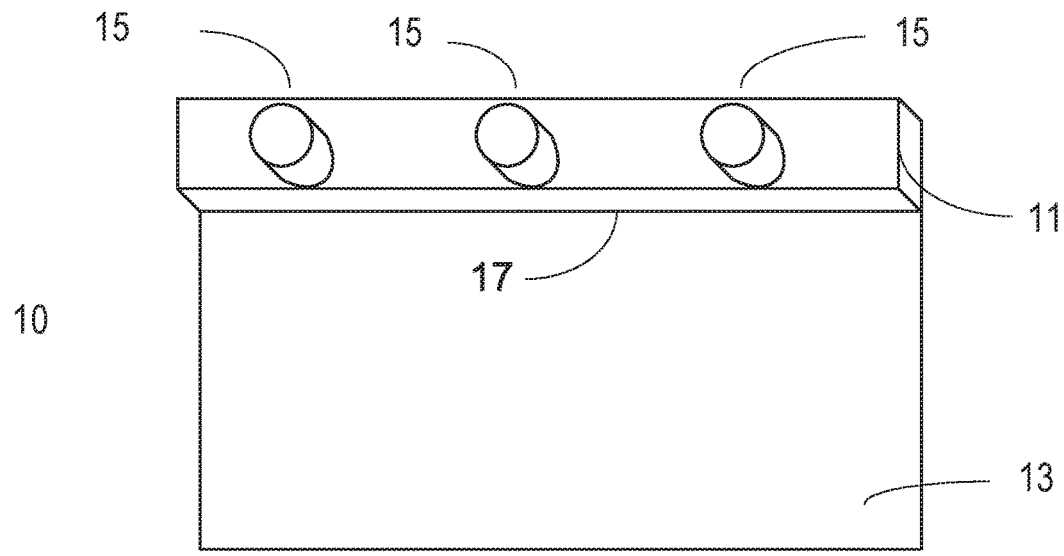
FIG. 1 includes an illustration of an example composite belt according to certain embodiments described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. Further, the use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the solar control arts.

Embodiments described herein are generally directed to composite belts. A composite belt may include a profile, and a belt. The profile may have a strip, and nodules. The profile may be attached to the belt such that each nodule extends out from the belt. A cooking apparatus may include a housing, a heat source, a drive roller, and a composite belt according to embodiments described herein.

These concepts are better understood in view of the embodiments described below that illustrate and do not limit the scope of the present disclosure.

FIG. 1 includes an illustration of a perspective view of a portion of a composite belt 10 formed according to embodiments described herein. As shown in FIG. 1, the composite belt 10 may include a profile 11 and a belt 13. According to particular embodiments, the profile 11 may include a strip 17 and nodules 15 that protrude out from the strip 17. According to still other embodiments, the profile 11 may be located on the belt 13 such that the nodules 15 extend out from the belt.

Figure 2:
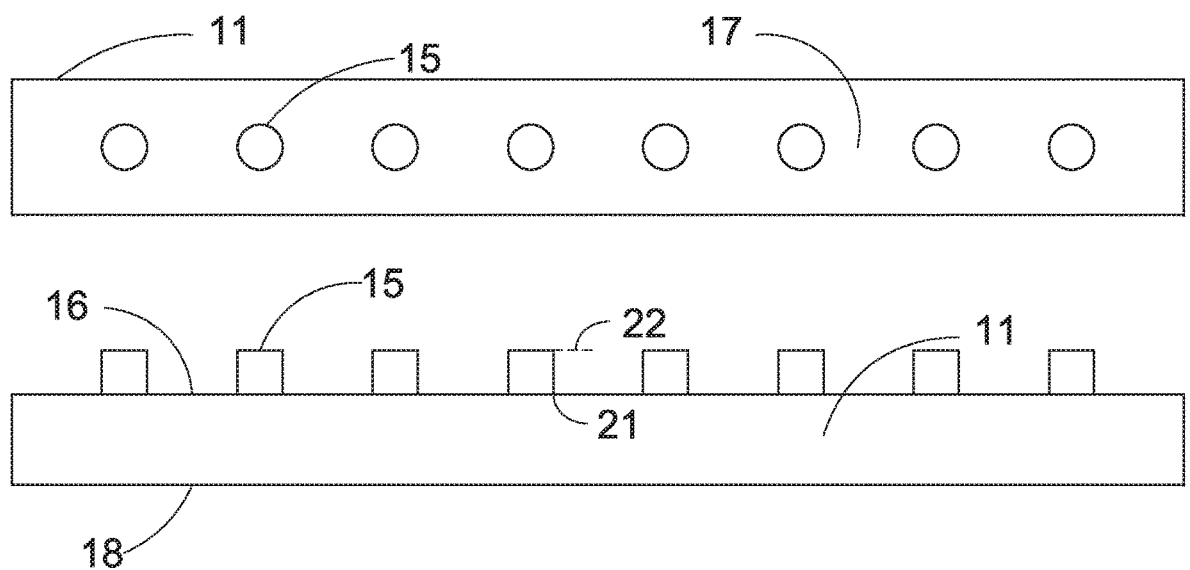
FIG. 2 includes an illustration of an example profile according to certain embodiments described herein.

FIG. 2 includes an illustration of a cross section of a profile 11 according to embodiments described herein. As shown in FIG. 2, the profile 11 may include a strip 11 and nodules 15. The profile 11 may further include an upper surface 16 adjacent the nodules 15 and a lower surface 18 opposite the nodules 15. It will be appreciated that the profile 11 of FIG. 2 may have any of the characteristics described herein with reference to the corresponding profile 11 in FIG. 1.

According to particular embodiments, the profile 11 may have a certain composition. For example, according to a particular embodiment, the profile 11 may include a polymer. According to another embodiment, the profile 11 may consist of a polymer. According to another embodiment, the profile 11 may include an elastomer. According to another embodiment, the profile 11 may consist of an elastomer. According to another embodiment, the profile 11 may include a silicone-based material. According to another embodiment, the profile 11 may consist of a silicone-based material. According to another embodiment, the profile 11 may include a silicone-based polymer. According to another embodiment, the profile 11 may consist of a silicone-based polymer. According to another embodiment, the profile 11 may include a polysiloxane. According to another embodiment, the profile 11 may consist of a polysiloxane. According to another embodiment, the profile 11 may include a fluoropolymer. According to another embodiment, the profile 11 may consist of a fluoropolymer. According to another embodiment, the profile 11 may include a perfluoropolymer. According to another embodiment, the profile 11 may consist of a perfluoropolymer. According to another embodiment, the profile 11 may include a polytetrafluoroethylene. According to another embodiment, the profile 11 may consist of a polytetrafluoroethylene. According to another embodiment, the profile 11 may include a food grade material. According to another embodiment, the profile 11 may consist of a food grade material. According to another embodiment, the profile 11 may include a combination of two or more of a polymer, an elastomer, a silicone-based material, a silicone-based polymer, a polysiloxane, a fluoropolymer, a perfluoropolymer, a polytetrafluoroethylene, and a food grade material. According to another embodiment, the profile 11 may consist of a combination of two or more of a polymer, an elastomer, a silicone-based material, a silicone-based polymer, a polysiloxane, a fluoropolymer, a perfluoropolymer, a polytetrafluoroethylene, and a food grade material.

According to particular embodiments, the strip 17 may have a particular width. For example, the strip 17 may have a width of not greater than about 5 cm, such as, not greater than about 4 cm, or not greater than about 3 cm, or not greater than about 2.5 cm, or not greater than about 2.2 cm, or not greater than about 2 cm, or not greater than about 1.9 cm, or not greater than about 1.8 cm, or not greater than about 1.7 cm, or not greater than about 1.6 cm, or not greater than about 1.5 cm, or not greater than about 1.4 cm, or not greater than about 1.3 cm, or not greater than about 1.2 cm, or not greater than about 1.1 cm, or not greater than about 1 cm, or not greater than about 0.9 cm, or not greater than about 0.8 cm, or not greater than about 0.5 cm, or even not greater than about 0.2 cm. According to still other embodiments, the strip 17 may have a width of at least about 0.1 cm, such as, at least about 0.2 cm, or at least about 0.5 cm, or at least about 0.8 cm, or at least about 0.9 cm, or at least about 1 cm, or at least about 1.1 cm, or at least about 1.2 cm, or at least about 1.3 cm, or at least about 1.4 cm, or at least about 1.5 cm, or at least about 1.6 cm, or at least about 1.7 cm, or at least about 1.8 cm, or at least about 1.9 cm, or at least about 2 cm, or at least about 2.5 cm, or at least about 3 cm, or even at least about 4 cm. It will be appreciated that the strip 17 may have a width within a range between any of the minimum and maximum values noted above. It will be further appreciated that the strip 17 may have a width of any value between any of the minimum and maximum values noted above.

According to particular embodiments, the strip 17 may have a particular width relative to the width of the belt 13. For example, the strip 17 may have width of not greater than about 20% of the width of the belt 13, such as, not greater than about 18% of the width of the belt 13, or not greater than about 16% of the width of the belt 13, or not greater than about 15% of the width of the belt 13, or not greater than about 14% of the width of the belt 13, or not greater than about 13% of the width of the belt 13, or not greater than about 12% of the width of the belt 13, or not greater than about 11% of the width of the belt 13, or not greater than about 10% of the width of the belt 13, or not greater than about 9% of the width of the belt 13, or not greater than about 8% of the width of the belt 13, or not greater than about 7% of the width of the belt 13, or not greater than about 6% of the width of the belt 13, or not greater than about 5% of the width of the belt 13 or not greater than about 4% of the width of the belt 13, or not greater than about 3.5% of the width of the belt 13, or not greater than about 3% of the width of the belt 13, or not greater than about 2.5% of the width of the belt 13, or not greater than about 2% of the width of the belt 13, or even not greater than about 1% of the width of the belt 13. According to still other embodiments, the strip 17 may have a width of at least about 1% of the width of the belt 13, such as, at least about 2% of the width of the belt 13, or at least about 2.5% of the width of the belt, or at least about 3% of the width of the belt, or at least about 3.5% of the width of the belt 13, or at least about 4% of the width of the belt 13 or at least about 5% of the width of the belt 13, or at least about 6% of the width of the belt 13, or at least about 7% of the width of the belt 13, or at least about 8% of the width of the belt 13, or at least about 9% of the width of the belt 13, or at least about 10% of the width of the belt 13, or at least about 11% of the width of the belt 13, or at least about 12% of the width of the belt 13, or at least about 13% of the width of the belt 13, or at least about 14% of the width of the belt 13, or at least about 15% of the width of the belt 13, or at least about 16% of the width of the belt 13, or even at least about 18% of the width of the belt 13. It will be appreciated that the strip 17 may have a width within a range between any of the minimum and maximum values noted above. It will be further appreciated that the strip 17 may have a width of any value between any of the minimum and maximum values noted above.

According to yet other embodiments, the strip 17 may have a particular length. For example, the strip 17 may have a length of not greater than about 500 cm, such as, not greater than about 450 cm, or not greater than about 400 cm, or not greater than about 350 cm, or not greater than about 300 cm, or not greater than about 250 cm, or not greater than about 200 cm, or not greater than about 180 cm, or not greater than about 160 cm, or not greater than about 140 cm, or not greater than about 120 cm, or not greater than about 100 cm, or not greater than about 90 cm, or not greater than about 85 cm, or not greater than about 80 cm, or not greater than about 75 cm, or not greater than about 70 cm, or not greater than about 60 cm, or not greater than about 50 cm, or not greater than about 40 cm, or not greater than about 30 cm, or even not greater than about 20 cm. According to still other embodiments, the strip 17 may have a length of at least about 10 cm, such as, at least about 20 cm, or at least about 30 cm, or at least about 40 cm, or at least about 50 cm, or at least about 60 cm, or at least about 70 cm, or at least about 75 cm, or at least about 80 cm, or at least about 85 cm, or at least about 90 cm, or at least about 100 cm, or at least about 120 cm, or at least about 140 cm, or at least about 160 cm, or at least about 180 cm, or at least about 200 cm, or at least about 250 cm, or at least about 300 cm, or at least about 350 cm, or at least about 400 cm, or even at least about 450 cm. It will be appreciated that the strip 17 may have a length within a range between any of the minimum and maximum values noted above. It will be further appreciated that the strip 17 may have a length of any value between any of the minimum and maximum values noted above.

According to particular embodiments, the strip 17 may have a particular length relative to the length of the belt 13. For example, the strip 17 may have a length of not greater than about 100% of the length of the belt 13, such as, or not greater than about 98% of the length of the belt 13, or not greater than about 95% of the length of the belt 13, or not greater than about 90% of the length of the belt 13, or not greater than about 85% of the length of the belt 13, or not greater than about 80% of the length of the belt 13, or not greater than about 75% of the length of the belt 13, or not greater than about 70% of the length of the belt 13, or not greater than about 65% of the length of the belt 13, or not greater than about 60% of the length of the belt 13, or not greater than about 55% of the length of the belt 13, or not greater than about 50% of the length of the belt 13, or not greater than about 45% of the length of the belt 13, or not greater than about 40% of the length of the belt 13, or not greater than about 35% of the length of the belt 13, or not greater than about 30% of the length of the belt 13, or not greater than about 25% of the length of the belt 13, or not greater than about 20% of the length of the belt 13, or not greater than about 15% of the length of the belt 13, or even not greater than about 10% of the length of the belt 13. According to still other embodiments, the strip 17 may have a length of at least about 5% of the length of the belt 13, such as, at least about 10% of the length of the belt 13, or at least about 15% of the length of the belt 13, or at least about 20% of the length of the belt 13, or at least about 25% of the length of the belt 13, or at least about 30% of the length of the belt 13, or at least about 35% of the length of the belt 13, or at least about 40% of the length of the belt 13, or at least about 45% of the length of the belt 13, or at least about 50% of the length of the belt 13, or at least about 55% of the length of the belt 13, or at least about 60% of the length of the belt 13, or at least about 65% of the length of the belt 13, or at least about 70% of the length of the belt 13, or at least about 75% of the length of the belt 13, or at least about 80% of the length of the belt 13, or at least about 85% of the length of the belt 13, or at least about 90% of the length of the belt 13, or at least about 95% of the length of the belt 13, or even at least about 98% of the length of the belt 13. It will be appreciated that the strip 17 may have a length within a range between any of the minimum and maximum values noted above. It will be further appreciated that the strip 17 may have a length of any value between any of the minimum and maximum values noted above.

According to particular embodiments, the nodules 15 may have a particular shape. For example, the nodules 15 may be radially symmetric. According to another embodiment, the nodules 15 may be cylindrical. According to another embodiment, the nodules 15 may be bulbous.

According to particular embodiments, the nodules 15 may have a constant diameter for the full height of each nodule 15, for example, in those embodiments where the nodules are cylindrical. According to other embodiments, the nodules 15 may have a diameter which varies at different points along the height of each nodule 15.

According to particular embodiments, the nodules 15 may have a particular maximum diameter. For example, the nodules 15 may have a maximum diameter of not greater than about 50 mm, such as, not greater than about 40 mm, or not greater than about 30 mm, or not greater than about 25 mm, or not greater than about 20 mm, or not greater than about 15 mm, or not greater than about 10 mm, or not greater than about 8 mm, or not greater than about 6 mm, or not greater than about 5.5 mm, or not greater than about 5 mm, or not greater than about 4.9 mm, or not greater than about 4.8 mm, or not greater than about 4.7 mm, or not greater than about 4.6 mm, or not greater than about 4.5 mm, or not greater than about 4.4 mm, or not greater than about 4.3 mm, or not greater than about 4.2 mm, or not greater than about 4.1 mm, or not greater than about 4 mm, or not greater than about 3.9 mm, or not greater than about 3.8 mm, or not greater than about 3.7 mm, or not greater than about 3.5 mm, or not greater than about 3.3 mm or not greater than about 3 mm or not greater than about 2.5 mm or not greater than about 2 mm or even not greater than about 1 mm. According to still other embodiments, the nodules 15 may have a maximum diameter of at least about 0.5 mm, such as, or at least about 1 mm or at least about 2 mm or at least about 2.5 mm or at least about 3 mm or at least about 3.3 mm, or at least about 3.5 mm, or at least about 3.7 mm, or at least about 3.8 mm, or at least about 3.9 mm, or at least about 4 mm, or at least about 4.1 mm, or at least about 4.2 mm, or at least about 4.3 mm, or at least about 4.4 mm, or at least about 4.5 mm, or at least about 4.6 mm, or at least about 4.7 mm, or at least about 4.8 mm, or at least about 4.9 mm, or at least about 5 mm, or at least about 5.5 mm, or at least about 6 mm, or at least about 8 mm, or at least about 10 mm, or at least about 15 mm, or at least about 20 mm, or at least about 25 mm, or at least about 30 mm, or even at least about 40 mm. It will be appreciated that the nodules 17 may have a maximum diameter within a range between any of the minimum and maximum values noted above. It will be further appreciated that the nodules may have a maximum diameter of any value between any of the minimum and maximum values noted above.

According to particular embodiments, the nodules 15 may have a particular maximum circumference. For example, the nodules 15 may have a maximum circumference of not greater than about 160 mm, such as, not greater than about 125 mm or not greater than about 100 mm, or not greater than about 80 mm, or not greater than about 60 mm or not greater than about 45 mm, or not greater than about 30 mm, or not greater than about 25 mm, or not greater than about 20 mm, or not greater than about 18 mm, or not greater than about 17 mm, or not greater than about 16 mm, or not greater than about 15 mm, or not greater than about 14 mm, or not greater than about 13 mm, or not greater than about 12 mm, or not greater than about 11 mm, or not greater than about 10 mm or not greater than about 8 mm or even not greater than about 5 mm. According to still other embodiments, the nodules 15 may have a maximum circumference of at least about 1 mm, such as, at least about 5 mm or at least about 8 mm or at least about 10 mm, or at least about 11 mm, or at least about 12 mm, or at least about 13 mm, or at least about 14 mm, or at least about 15 mm, or at least about 16 mm, or at least about 17 mm, or at least about 18 mm, or at least about 20 mm, or at least about 25 mm, or at least about 30 mm, or at least about 45 mm or at least about 60 mm, or at least about 80 mm, or at least about 100 mm, or even at least about 125 mm. It will be appreciated that the nodules 17 may have a maximum circumference within a range between any of the minimum and maximum values noted above. It will be further appreciated that the nodules may have a maximum circumference of any value between any of the minimum and maximum values noted above.

According to particular embodiments, the nodules 15 may have a particular height measured from an end 21 contacting the upper surface 16 to a tip 22 opposite the end 21. For example, the nodules 15 may have a height of not greater than about 25 mm, such as, or not greater than about 20 mm, or not greater than about 15 mm, or not greater than about 10 mm, or not greater than about 9 mm, or not greater than about 8 mm, or not greater than about 7 mm, or not greater than about 6 mm, or not greater than about 5 mm, or not greater than about 4 mm, or not greater than about 3.8 mm, or not greater than about 3.6 mm, or not greater than about 3.5 mm, or not greater than about 3.4 mm, or not greater than about 3.3 mm, or not greater than about 3.2 mm, or not greater than about 3.1 mm, or not greater than about 3 mm, or not greater than about 2.9 mm, or not greater than about 2.8 mm, or not greater than about 2.7 mm, or not greater than about 2.6 mm, or not greater than about 2.5 mm, or not greater than about 2.3 mm, or not greater than about 2 mm, or even not greater than about 1.5 mm. According to still other embodiments, the nodules 15 may have a height of at least about 1 mm, such as, at least about 1.5 mm, or at least about 2 mm, or at least about 2.3 mm, or at least about 2.5 mm, or at least about 2.6 mm, or at least about 2.7 mm, or at least about 2.8 mm, or at least about 2.9 mm, or at least about 3 mm, or at least about 3.1 mm, or at least about 3.2 mm, or at least about 3.3 mm, or at least about 3.4 mm, or at least about 3.5 mm, or at least about 3.6 mm, or at least about 3.8 mm, or at least about 4 mm, or at least about 5 mm, or at least about 6 mm, or at least about 7 mm, or at least about 8 mm, or at least about 9 mm, or at least about 10 mm, or at least about 15 mm, or even at least about 20 mm. It will be appreciated that the nodules 15 may have a height within a range between any of the minimum and maximum values noted above. It will be further appreciated that the nodules 15 may have a height of any value between any of the minimum and maximum values noted above.

Figure 3:
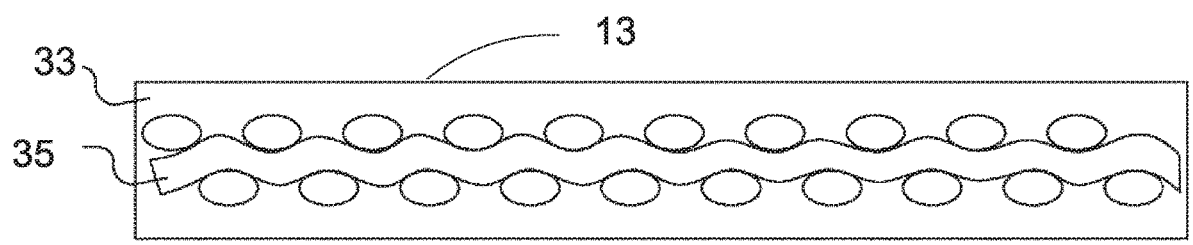
FIG. 3 includes an illustration of an example belt according to certain embodiments described herein.

FIG. 3 includes an illustration of a cross section of an example belt 13 according to embodiments described herein. As shown in FIG. 3, the belt 13 may include an outer layer 33 coating one or more fibers 35. According to particular embodiments, the outer layer 33 may partially coat the fibers 35. In other embodiments, the outer layer 33 may fully coat the fibers 35.

According to particular embodiments, the belt 13 may have a certain composition that includes the outer layer 33. For example, according to a particular embodiment, the belt 13 may include a polymer. According to another embodiment, the belt 13 may consist of a polymer. According to another embodiment, the belt 13 may include an elastomer. According to another embodiment, the belt 13 may consist of an elastomer. According to another embodiment, the belt 13 may include a silicone-based material. According to another embodiment, the belt 13 may consist of a silicone-based material. According to another embodiment, the belt 13 may include a silicone-based polymer. According to another embodiment, the belt 13 may consist of a silicone-based polymer. According to another embodiment, the belt 13 may include a polysiloxane. According to another embodiment, the belt 13 may consist of a polysiloxane. According to another embodiment, the belt 13 may include a fluoropolymer. According to another embodiment, the belt 13 may consist of a fluoropolymer. According to another embodiment, the belt 13 may include a perfluoropolymer. According to another embodiment, the belt 13 may consist of a perfluoropolymer. According to another embodiment, the belt 13 may include a polytetrafluoroethylene. According to another embodiment, the belt 13 may consist of a polytetrafluoroethylene. According to another embodiment, the belt 13 may include a food grade material. According to another embodiment, the belt 13 may consist of a food grade material. According to another embodiment, the belt 13 may include a combination of two or more of a polymer, an elastomer, a silicone-based material, a silicone-based polymer, a polysiloxane, a fluoropolymer, a perfluoropolymer, a polytetrafluoroethylene, and a food grade material. According to another embodiment, the belt 13 may consist of a combination of two or more of a polymer, an elastomer, a silicone-based material, a silicone-based polymer, a polysiloxane, a fluoropolymer, a perfluoropolymer, a polytetrafluoroethylene, and a food grade material.

According to particular embodiments, the belt 13 may include a fiber 35 having a certain composition. For example, according to a particular embodiment, the fiber 35 may include a mineral fiber. According to another embodiment, the fiber 35 may consist of a mineral fiber. According to another embodiment, the fiber 35 may include a glass. According to another embodiment, the fiber 35 may consist of a glass. According to another embodiment, the fiber 35 may include a quartz. According to another embodiment, the fiber 35 may consist of a quartz. According to another embodiment, the fiber 35 may include a silica. According to another embodiment, the fiber 35 may consist of a silica. According to another embodiment, the fiber 35 may include a combination of two or more of a glass, a quartz, and a silica. According to another embodiment, the fiber 35 may consist of a combination of two or more of a glass, a quartz, and a silica. According to another embodiment, the fiber 35 may include an organic fiber. According to another embodiment, the fiber 35 may consist of an organic fiber. According to another embodiment, the fiber 35 may include a polyester. According to another embodiment, the fiber 35 may consist of a polyester. According to another embodiment, the fiber 35 may include a polyethylene. According to another embodiment, the fiber 35 may consist of a polyethylene. According to another embodiment, the fiber 35 may include a polyamide. According to another embodiment, the fiber 35 may consist of a polyamide. According to another embodiment, the fiber 35 may include an aramid. According to another embodiment, the fiber 35 may consist of an aramid. According to another embodiment, the fiber 35 may include a polymethyl methacrylate. According to another embodiment, the fiber 35 may consist of a polymethyl methacrylate. According to another embodiment, the fiber 35 may include a polycarbonate. According to another embodiment, the fiber 35 may consist of a polycarbonate. According to another embodiment, the fiber 35 may include a cycloolefin. According to another embodiment, the fiber 35 may consist of a cycloolefin. According to another embodiment, the fiber 35 may include a fluoropolymer. According to another embodiment, the fiber 35 may consist of a fluoropolymer. According to another embodiment, the fiber 35 may include a carbon fiber. According to another embodiment, the fiber 35 may consist of a carbon fiber. According to another embodiment, the fiber 35 may include a combination of two or more of a polyester, a polyethylene, a polyamide, an aramid, a polymethyl methacrylate, a polycarbonate, a cycloolefin, a fluoropolymer, and a carbon fiber. According to another embodiment, the fiber 35 may consist of a combination of two or more of a polyester, a polyethylene, a polyamide, an aramid, a polymethyl methacrylate, a polycarbonate, a cycloolefin, a fluoropolymer, and a carbon fiber. According to another embodiment, the fiber 35 may include a combination of mineral and organic fibers. According to another embodiment, the fiber 35 may consist of a combination of mineral and organic fibers.

According to particular embodiments, the composite belt 10 may include a food grade material. In certain embodiments, the composite belt 10 may consist of food grade material. A food grade material is a material that is generally recognized as safe for use in contact with food.

According to particular embodiments, the belt 13 may have a particular length. For example, the belt 13 may have a length of not greater than about 500 cm, such as, not greater than about 450 cm, or not greater than about 400 cm, or not greater than about 350 cm, or not greater than about 300 cm, or not greater than about 250 cm, or not greater than about 200 cm, or not greater than about 150 cm, or not greater than about 125 cm, or not greater than about 100 cm, or not greater than about 90 cm, or not greater than about 85 cm, or not greater than about 80 cm, or not greater than about 75 cm, or not greater than about 70 cm, or not greater than about 60 cm, or not greater than about 50 cm, or not greater than about 40 cm, or not greater than about 30 cm, or even not greater than about 20 cm. According to still other embodiments, the belt 13 may have a length of at least about 10 cm, or at least about 20 cm, or at least about 30 cm, or at least about 40 cm, or at least about 50 cm, or at least about 60 cm, or at least about 70 cm, or at least about 75 cm, or at least about 80 cm, or at least about 85 cm, or at least about 90 cm, or at least about 100 cm, or at least about 125 cm, or at least about 150 cm, or at least about 200 cm, or at least about 250 cm, or at least about 300 cm, or at least about 350 cm, or at least about 400 cm, or at least about 450 cm. It will be appreciated that the belt 13 may have a length within a range between any of the minimum and maximum values noted above. It will be further appreciated that the belt 13 may have a length of any value between any of the minimum and maximum values noted above.

According to particular embodiments, the belt 13 may have a particular width. For example, the belt 13 may have a width of not greater than about 200 cm, or not greater than about 175 cm, or not greater than about 150 cm, or not greater than about 125 cm, or not greater than about 100 cm, or not greater than about 90 cm, or not greater than about 80 cm, or not greater than about 75 cm, or not greater than about 70 cm, or not greater than about 65 cm, or not greater than about 60 cm, or not greater than about 55 cm, or not greater than about 50 cm, or not greater than about 45 cm, or not greater than about 40 cm, or not greater than about 35 cm, or not greater than about 30 cm, or not greater than about 25 cm, or not greater than about 20 cm, or not greater than about 18 cm, or not greater than about 16 cm, or not greater than about 15 cm, or not greater than about 14 cm, or not greater than about 13 cm, or not greater than about 12 cm, or not greater than about 11 cm, or not greater than about 10 cm. According to still other embodiments, the belt 13 may have a width of at least about 5 cm, or at least about 10 cm, or at least about 11 cm, or at least about 12 cm, or at least about 13 cm, or at least about 14 cm, or at least about 15 cm, or at least about 16 cm, or at least about 18 cm, or at least about 20 cm, or at least about 25 cm, or at least about 30 cm, or at least about 35 cm, or at least about 40 cm, or at least about 45 cm, or at least about 50 cm, or at least about 55 cm, or at least about 60 cm, or at least about 65 cm, or at least about 70 cm, or at least about 75 cm, or at least about 80 cm, or at least about 90 cm, or at least about 100 cm, or at least about 125 cm, or at least about 150 cm, or at least about 175 cm. It will be appreciated that the belt 13 may have a width within a range between any of the minimum and maximum values noted above. It will be further appreciated that the belt 13 may have a width of any value between any of the minimum and maximum values noted above.

According to particular embodiments, the belt 13 may have a particular thickness. For example, the belt 13 may have a thickness of not greater than about 4 mm, or not greater than about 3 mm, or not greater than about 2 mm, or not greater than about 1.5 mm, or not greater than about 1 mm, or not greater than about 0.9 mm, or not greater than about 0.8 mm, or not greater than about 0.7 mm, or not greater than about 0.6 mm, or not greater than about 0.5 mm, or not greater than about 0.4 mm, or not greater than about 0.3 mm, or not greater than about 0.25 mm, or not greater than about 0.2 mm, or not greater than about 0.18 mm, or not greater than about 0.16 mm, or not greater than about 0.14 mm, or not greater than about 0.13 mm, or not greater than about 0.12 mm, or not greater than about 0.11 mm, or not greater than about 0.1 mm, or not greater than about 0.09 mm, or not greater than about 0.08 mm, or not greater than about 0.07 mm, or not greater than about 0.06 mm, or not greater than about 0.05 mm, or not greater than about 0.04 mm, or not greater than about 0.03 mm, or not greater than about 0.02 mm. According to still other embodiments, the belt 13 may have a thickness of at least about 0.01 mm, or at least about 0.02 mm, or at least about 0.03 mm, or at least about 0.04 mm, or at least about 0.05 mm, or at least about 0.06 mm, or at least about 0.07 mm, or at least about 0.08 mm, or at least about 0.09 mm, or at least about 0.1 mm, or at least about 0.11 mm, or at least about 0.12 mm, or at least about 0.13 mm, or at least about 0.14 mm, or at least about 0.16 mm, or at least about 0.18 mm, or at least about 0.2 mm, or at least about 0.25 mm, or at least about 0.3 mm, or at least about 0.4 mm, or at least about 0.5 mm, or at least about 0.6 mm, or at least about 0.7 mm, or at least about 0.8 mm, or at least about 0.9 mm, or at least about 1 mm, or at least about 1.5 mm, or at least about 2 mm, or at least about 3 mm. It will be appreciated that the belt 13 may have a thickness within a range between any of the minimum and maximum values noted above. It will be further appreciated that the belt 13 may have a thickness of any value between any of the minimum and maximum values noted above.

Figure 4A:
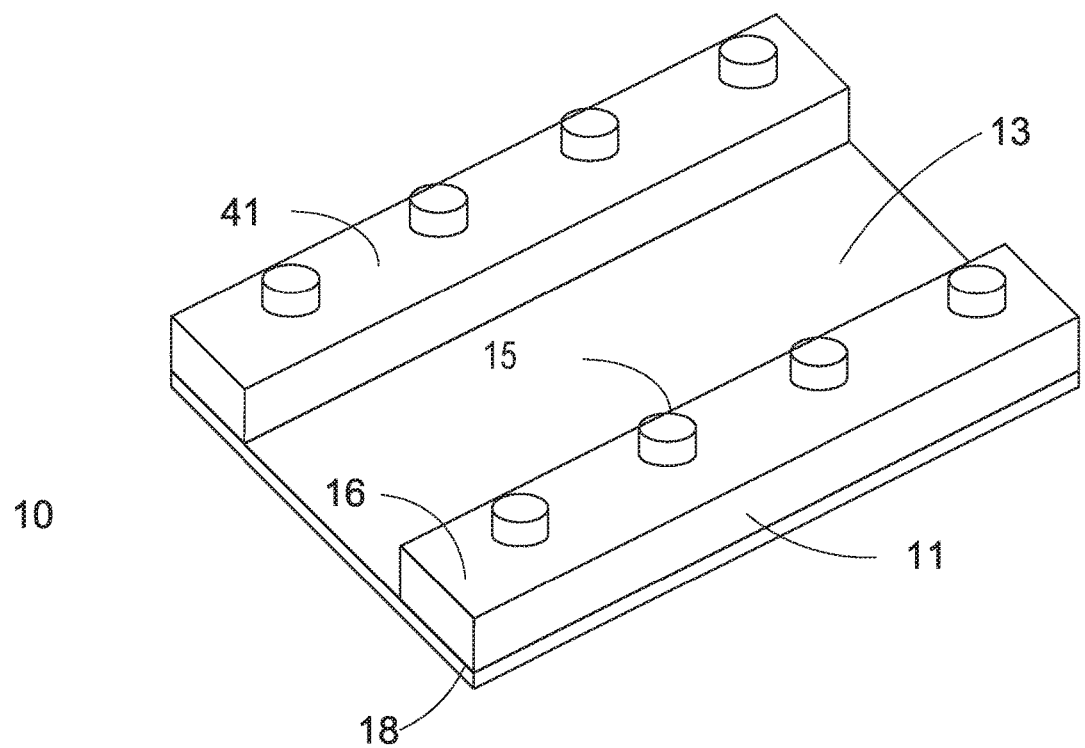
FIGS. 4A and 4B include illustrations of additional example composite belts according to certain embodiments described herein.

FIG. 4A includes an illustration of an example profile 11 attached to a belt 13 according to embodiments described herein. As shown in FIG. 4A, a profile 11 may be attached to the belt 13 such that the nodules 15 extend out from the belt. According to particular embodiments, the lower surface 18 of the profile 11 may be attached to the belt 13. In some embodiments, the outer side edge of the profile 11 may be attached at the edge of the belt 13. In still further embodiments, the profile 11 may be a first profile, and there may be a second profile 41 attached to the belt 13. The second profile 41 may have any of the characteristics of the first profile 11. In further embodiments, the belt 13 may have two edges, and a first profile 11 may be attached at or near one edge of the belt, and a second profile 41 may be attached at or near the other edge of the belt. In further embodiments, one or more additional profiles may be attached to the belt 13 between the first profile 11 and the second profile 41. Such additional profiles may, for example, provide tension and structural support to the belt 13 during operation.

It will be appreciated that the profile 11 and the belt 13 of FIG. 4A may have any of the characteristics described herein with reference to the corresponding profile 11 and belt 13 in FIG. 1, FIG. 2, and FIG. 3.

Figure 4B:
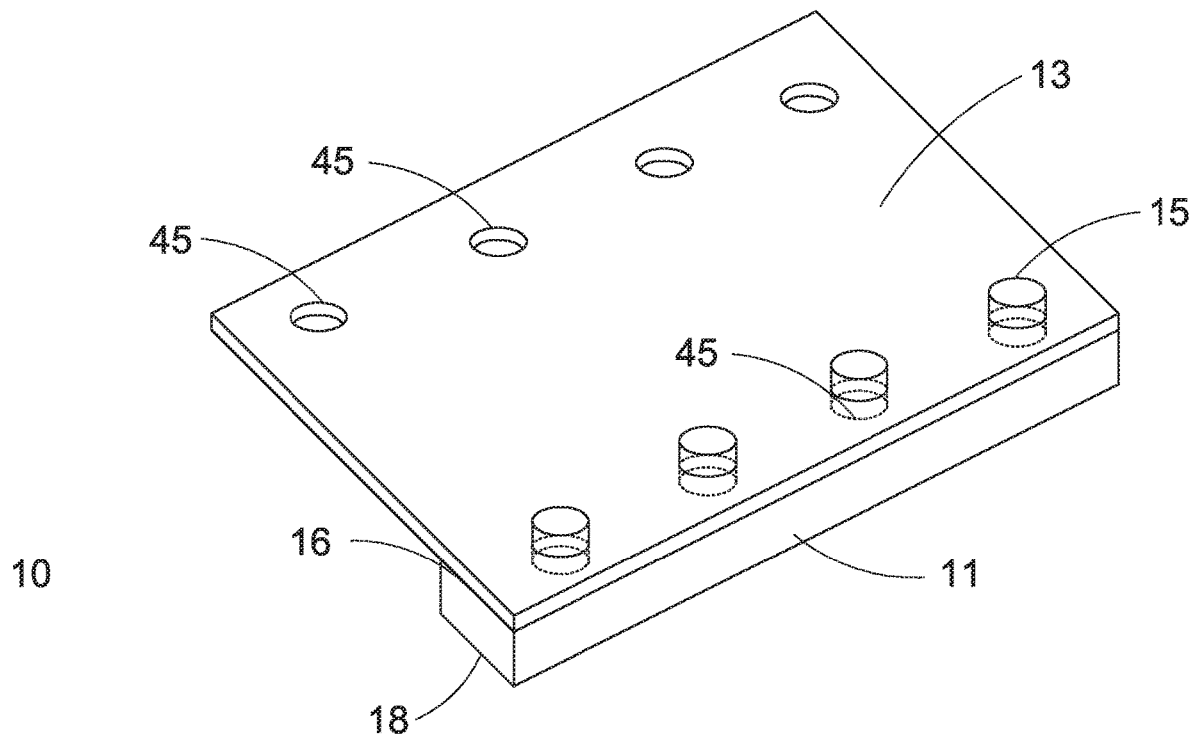

FIG. 4B includes an illustration of an example profile 11 attached to a belt 13 according to embodiments described herein. As shown in FIG. 4B, a profile 11 may be attached to the belt 13 such that the nodules 15 extend out from the belt. According to particular embodiments, the upper surface 16 of the profile 11 may be attached to the belt 13. Because the upper surface 16 is adjacent to the nodules, the belt may have apertures 45. The apertures 45 may be located such that they allow the nodules 15 to protrude through the belt 13 at the location where the profile 11 is attached, such that the upper surface 16 of the profile 11 may attach to the belt 13 and the nodules 15 may extend out from the belt. The belt may contain additional apertures 45 for attaching one or more additional profiles.

According to particular embodiments, the profile 11 may be a unitary article; in other words, the nodules 15 and the strip 17 may be a single unit.

In other embodiments the profile 11 may be multiple profiles arranged to form a line. Such a series of profiles may substitute for a single profile 11.

According to particular embodiments, the composite belt 10 may have more than one profile 11. For example, the composite belt 10 may have not greater than about 10 profiles or not greater than about 9 profiles or not greater than about 8 profiles or not greater than about 7 profiles or not greater than about 6 profiles or not greater than about 5 profiles or not greater than about 4 profiles or not greater than about 3 profiles or not greater than about 2 profiles. According to still other embodiments, the composite belt 10 may have at least about 1 profile or at least about 2 profiles or at least about 3 profiles or at least about 4 profiles or at least about 5 profiles or at least about 6 profiles or at least about 7 profiles or at least about 8 profiles or at least about 9 profiles. It will be appreciated that the composite belt 10 may have a number of profiles 11 within a range between any of the minimum and maximum values noted above.

According to particular embodiments, the profile 11 may be attached to the belt 13 by a staple. In other embodiments, the profile 11 may be attached to the belt 13 by a rivet. In other embodiments, the profile 11 may be attached to the belt 13 by a separable fastening device. In other embodiments, the profile 11 may be attached to the belt 13 by a heat seal. In other embodiments, the profile 11 may be attached to the belt 13 by a weld. In other embodiments, the profile 11 may be attached to the belt 13 by a radio frequency weld.

According to particular embodiments, the profile 11 may be attached to the belt 13 by a stitching material such as a thread. For example, according to a particular embodiment, the thread may include a mineral fiber. According to another embodiment, the thread may consist of a mineral fiber. According to another embodiment, the thread may include a glass. According to another embodiment, the thread may consist of a glass. According to another embodiment, the thread may include a quartz. According to another embodiment, the thread may consist of a quartz. According to another embodiment, the thread may include a silica. According to another embodiment, the thread may consist of a silica. According to another embodiment, the thread may include a combination of two or more of a glass, a quartz, and a silica. According to another embodiment, the thread may consist of a combination of two or more of a glass, a quartz, and a silica. According to another embodiment, the thread may include an organic fiber. According to another embodiment, the thread may consist of an organic fiber. According to another embodiment, the thread may include a polyester. According to another embodiment, the thread may consist of a polyester. According to another embodiment, the thread may include a polyethylene. According to another embodiment, the thread may consist of a polyethylene. According to another embodiment, the thread may include a polyamide. According to another embodiment, the thread may consist of a polyamide. According to another embodiment, the thread may include an aramid. According to another embodiment, the thread may consist of an aramid. According to another embodiment, the thread may include a polymethyl methacrylate. According to another embodiment, the thread may consist of a polymethyl methacrylate. According to another embodiment, the thread may include a polycarbonate. According to another embodiment, the thread may consist of a polycarbonate. According to another embodiment, the thread may include a cycloolefin. According to another embodiment, the thread may consist of a cycloolefin. According to another embodiment, the thread may include a fluoropolymer. According to another embodiment, the thread may consist of a fluoropolymer. According to another embodiment, the thread may include a carbon fiber. According to another embodiment, the thread may consist of a carbon fiber. According to another embodiment, the thread may include a combination of two or more of a polyester, a polyethylene, a polyamide, an aramid, a polymethyl methacrylate, a polycarbonate, a cycloolefin, a fluoropolymer, and a carbon fiber. According to another embodiment, the thread may consist of a combination of two or more of a polyester, a polyethylene, a polyamide, an aramid, a polymethyl methacrylate, a polycarbonate, a cycloolefin, a fluoropolymer, and a carbon fiber. According to another embodiment, the thread may include a combination of mineral and organic fibers. According to another embodiment, the thread may consist of a combination of mineral and organic fibers.

According to particular embodiments, the profile 11 may be attached to the belt 13 by an adhesive. For example, according to a particular embodiment, the adhesive may include a polymer. According to another embodiment, the adhesive may consist of a polymer. According to another embodiment, the adhesive may include an elastomer. According to another embodiment, the adhesive may consist of an elastomer. According to another embodiment, the adhesive may include a silicone-based material. According to another embodiment, the adhesive may consist of a silicone-based material. According to another embodiment, the adhesive may include a silicone-based polymer. According to another embodiment, the adhesive may consist of a silicone-based polymer. According to another embodiment, the adhesive may include a polysiloxane. According to another embodiment, the adhesive may consist of a polysiloxane. According to another embodiment, the adhesive may include a fluoropolymer. According to another embodiment, the adhesive may consist of a fluoropolymer. According to another embodiment, the adhesive may include a perfluoropolymer. According to another embodiment, the adhesive may consist of a perfluoropolymer. According to another embodiment, the adhesive may include a polytetrafluoroethylene. According to another embodiment, the adhesive may consist of a polytetrafluoroethylene. According to another embodiment, the adhesive may include a food grade material. According to another embodiment, the adhesive may consist of a food grade material. According to another embodiment, the adhesive may include a combination of two or more of a polymer, an elastomer, a silicone-based material, a silicone-based polymer, a polysiloxane, a fluoropolymer, a perfluoropolymer, a polytetrafluoroethylene, and a food grade material. According to another embodiment, the adhesive may consist of a combination of two or more of a polymer, an elastomer, a silicone-based material, a silicone-based polymer, a polysiloxane, a fluoropolymer, a perfluoropolymer, a polytetrafluoroethylene, and a food grade material.

According to particular embodiments, the profile 11 may be attached to the belt 13 by an adhesive, and the adhesive may further include a tie coat. For example, according to a particular embodiment, the tie coat may include a colloidal suspension, and the colloidal suspension may include silica. According to another embodiment, the tie coat may consist of a colloidal suspension, and the colloidal suspension may include silica. According to another embodiment, the tie coat may include a polymer. According to another embodiment, the tie coat may consist of a polymer. According to another embodiment, the tie coat may include an elastomer. According to another embodiment, the tie coat may consist of an elastomer. According to another embodiment, the tie coat may include a silicone-based material. According to another embodiment, the tie coat may consist of a silicone-based material. According to another embodiment, the tie coat may include a silicone-based polymer. According to another embodiment, the tie coat may consist of a silicone-based polymer. According to another embodiment, the tie coat may include a polysiloxane. According to another embodiment, the tie coat may consist of a polysiloxane. According to another embodiment, the tie coat may include a fluoropolymer. According to another embodiment, the tie coat may consist of a fluoropolymer. According to another embodiment, the tie coat may include a perfluoropolymer. According to another embodiment, the tie coat may consist of a perfluoropolymer. According to another embodiment, the tie coat may include a polytetrafluoroethylene. According to another embodiment, the tie coat may consist of a polytetrafluoroethylene. According to another embodiment, the tie coat may include a food grade material. According to another embodiment, the tie coat may consist of a food grade material. According to another embodiment, the tie coat may include a combination of two or more of a polymer, an elastomer, a silicone-based material, a silicone-based polymer, a polysiloxane, a fluoropolymer, a perfluoropolymer, a polytetrafluoroethylene, and a food grade material. According to another embodiment, the tie coat may consist of a combination of two or more of a polymer, an elastomer, a silicone-based material, a silicone-based polymer, a polysiloxane, a fluoropolymer, a perfluoropolymer, a polytetrafluoroethylene, and a food grade material.

According to particular embodiments, the outer side edge of the profile 11 may be located on the belt 13 at a particular distance from the edge of the belt 13. For example, the outer side edge of the profile 11 may be located on the belt 13 at a distance of not greater than about 50% of the width of the profile or not greater than about 45% of the width of the profile or not greater than about 40% of the width of the profile or not greater than about 35% of the width of the profile or not greater than about 30% of the width of the profile or not greater than about 25% of the width of the profile or not greater than about 20% of the width of the profile or not greater than about 15% of the width of the profile or not greater than about 10% of the width of the profile or not greater than about 5% of the width of the profile from the edge of the belt 13. According to still other embodiments, the outer side edge of the profile 11 may be located on the belt 13 at a distance of at least about 1% of the width of the profile or at least about 5% of the width of the profile or at least about 10% of the width of the profile or at least about 15% of the width of the profile or at least about 20% of the width of the profile or at least about 25% of the width of the profile or at least about 30% of the width of the profile or at least about 35% of the width of the profile or at least about 40% of the width of the profile or at least about 45% of the width of the profile from the edge of the belt 13. It will be appreciated that the outer side edge of the profile 11 may be located on the belt 13 at a distance from the edge of the belt 13 within a range between any of the minimum and maximum values noted above. It will be further appreciated that the outer side edge of the profile 11 may be located on the belt 13 at a distance from the edge of the belt 13 of any value between any of the minimum and maximum values noted above.

According to particular embodiments, the outer side edge of the profile 11 may be located past the edge of the belt 13 at a particular distance from the edge of the belt 13. For example, the outer side edge of the profile 11 may be located past the edge of the belt 13 at a distance of not greater than about 50% of the width of the profile or not greater than about 45% of the width of the profile or not greater than about 40% of the width of the profile or not greater than about 35% of the width of the profile or not greater than about 30% of the width of the profile or not greater than about 25% of the width of the profile or not greater than about 20% of the width of the profile or not greater than about 15% of the width of the profile or not greater than about 10% of the width of the profile or not greater than about 5% of the width of the profile from the edge of the belt 13. According to still other embodiments, the outer side edge of the profile 11 may be located past the edge of the belt 13 at a distance of at least about 1% of the width of the profile or at least about 5% of the width of the profile or at least about 10% of the width of the profile or at least about 15% of the width of the profile or at least about 20% of the width of the profile or at least about 25% of the width of the profile or at least about 30% of the width of the profile or at least about 35% of the width of the profile or at least about 40% of the width of the profile or at least about 45% of the width of the profile from the edge of the belt 13. It will be appreciated that the outer side edge of the profile 11 may be located past the edge of the belt 13 at a distance from the edge of the belt 13 within a range between any of the minimum and maximum values noted above. It will be further appreciated that the outer side edge of the profile 11 may be located past the edge of the belt 13 at a distance from the edge of the belt 13 of any value between any of the minimum and maximum values noted above.

It will be appreciated that the profile 11 and the belt 13 of FIG. 4B may have any of the characteristics described herein with reference to the corresponding profile 11 and belt 13 in FIG. 1, FIG. 2, FIG. 3, and FIG. 4A.

Figure 5:
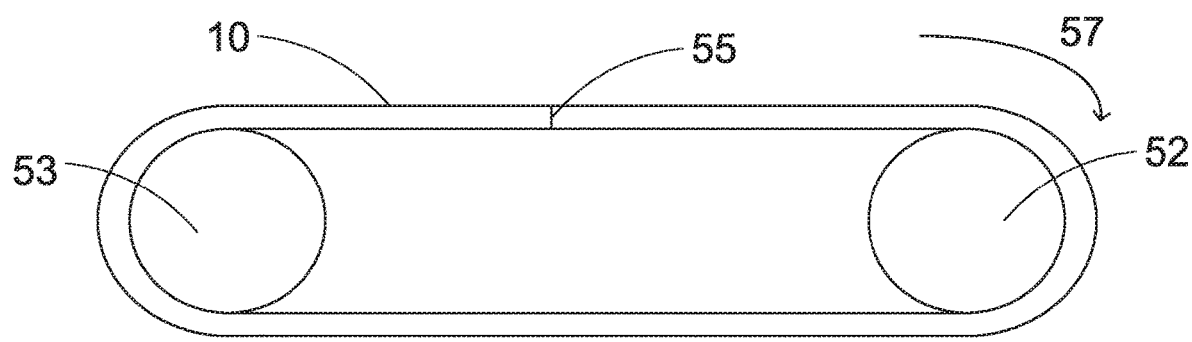
FIG. 5 includes an illustration of another example composite belt according to certain embodiments described herein.

FIG. 5 includes an illustration of an example composite belt 10 according to embodiments described herein. As shown in FIG. 5, a composite belt 10 of a particular length may have a first end and a second end that are joined together at a joint 55 such that the composite belt 10 forms a continuous loop. In further embodiments, the composite belt 10 is wrapped around rollers 52 and 53 to provide tension and structural support to the composite belt 10 such that it may rotate in a longitudinal direction 57.

According to particular embodiments, the profile 11 may be located on the belt 13 and the nodules 15 may be located on the profile 11 such that they form a line in a longitudinal direction of the belt 13. In further embodiments, the belt 13 may form a continuous loop, and the nodules 15 may be located such that they form a continuous loop in a longitudinal direction of the belt. In other embodiments, the belt 13 may form a continuous loop, and the profile 11 may include a first end and a second end, and the profile 11 may be located on the belt such that the first end abuts the second end.

According to particular embodiments, the nodules 15 of one or more profiles 11 may have a particular placement on the belt. For example, two of the nodules 15 may be located not greater than about 500 mm apart, or not greater than about 200 mm apart, or not greater than about 100 mm apart, or not greater than about 90 mm apart, or not greater than about 80 mm apart, or not greater than about 70 mm apart, or not greater than about 65 mm apart, or not greater than about 60 mm apart, or not greater than about 55 mm apart, or not greater than about 50 mm apart, or not greater than about 45 mm apart, or not greater than about 40 mm apart, or not greater than about 35 mm apart, or not greater than about 30 mm apart, or not greater than about 25 mm apart, or not greater than about 20 mm apart or not greater than about 15 mm apart or not greater than about 10 mm apart or not greater than about 5 mm apart in a longitudinal direction of the belt. According to still other embodiments, two of the nodules 15 may be located at least about 1 mm apart or at least about 5 mm apart or at least about 10 mm apart or at least about 15 mm apart or at least about 20 mm apart, or at least about 25 mm apart, or at least about 30 mm apart, or at least about 35 mm apart, or at least about 40 mm apart, or at least about 45 mm apart, or at least about 50 mm apart, or at least about 55 mm apart, or at least about 60 mm apart, or at least about 65 mm apart, or at least about 70 mm apart, or at least about 80 mm apart, or at least about 90 mm apart, or at least about 100 mm apart, or at least about 200 mm apart in a longitudinal direction of the belt. According to still other embodiments, two of the nodules 15 may be located within a range of 90 mm apart to 100 mm apart, or within a range of 80 mm apart to 90 mm apart, or within a range of 70 mm apart to 80 mm apart, or within a range of 65 mm apart to 70 mm apart, or within a range of 60 mm apart to 65 mm apart, or within a range of 55 mm apart to 60 mm apart, or within a range of 50 mm apart to 55 mm apart, or within a range of 45 mm apart to 50 mm apart, or within a range of 40 mm apart to 45 mm apart, or within a range of 35 mm apart to 40 mm apart, or within a range of 30 mm apart to 35 mm apart, or within a range of 25 mm apart to 30 mm apart, or within a range of 20 mm apart to 25 mm apart, or within a range of 15 mm apart to 20 mm apart, or within a range of 10 mm apart to 15 mm apart, or within a range of 5 mm apart to 10 mm apart, or within a range of 1 mm apart to 5 mm apart. It will be appreciated that two of the nodules 15 may be located a distance apart within a range between any of the minimum and maximum values noted above. It will be further appreciated that two of the nodules 15 may be located a distance apart of any value between any of the minimum and maximum values noted above.

According to particular embodiments, by selection of appropriate materials the composite belt 10 may be adapted to withstand high temperatures. For example, the composite belt 10 may be adapted to withstand a temperature of not greater than about 400 degrees Celsius or not greater than about 380 degrees Celsius or not greater than about 360 degrees Celsius or not greater than about 340 degrees Celsius or not greater than about 320 degrees Celsius or not greater than about 300 degrees Celsius or not greater than about 280 degrees Celsius or not greater than about 260 degrees Celsius or not greater than about 240 degrees Celsius or not greater than about 220 degrees Celsius or not greater than about 200 degrees Celsius or not greater than about 180 degrees Celsius or not greater than about 160 degrees Celsius. According to still other embodiments, the composite belt 10 may be adapted to withstand a temperature of at least about 140 degrees Celsius or at least about 160 degrees Celsius or at least about 180 degrees Celsius or at least about 200 degrees Celsius or at least about 220 degrees Celsius or at least about 240 degrees Celsius or at least about 260 degrees Celsius or at least about 280 degrees Celsius or at least about 300 degrees Celsius or at least about 320 degrees Celsius or at least about 340 degrees Celsius or at least about 360 degrees Celsius or at least about 380 degrees Celsius. It will be appreciated that the composite belt 10 may be adapted to withstand a temperature within a range between any of the minimum and maximum values noted above. It will be further appreciated that the composite belt 10 may be adapted to withstand a temperature of any value between any of the minimum and maximum values noted above.

It will be appreciated that the composite belt 10 of FIG. 5 includes a profile 11 and a belt 13 and may have any of the characteristics described herein with reference to the corresponding profile 11 and belt 13 in FIG. 1, FIG. 2, FIG. 3, FIG. 4A, and FIG. 4B.

Figure 6A:
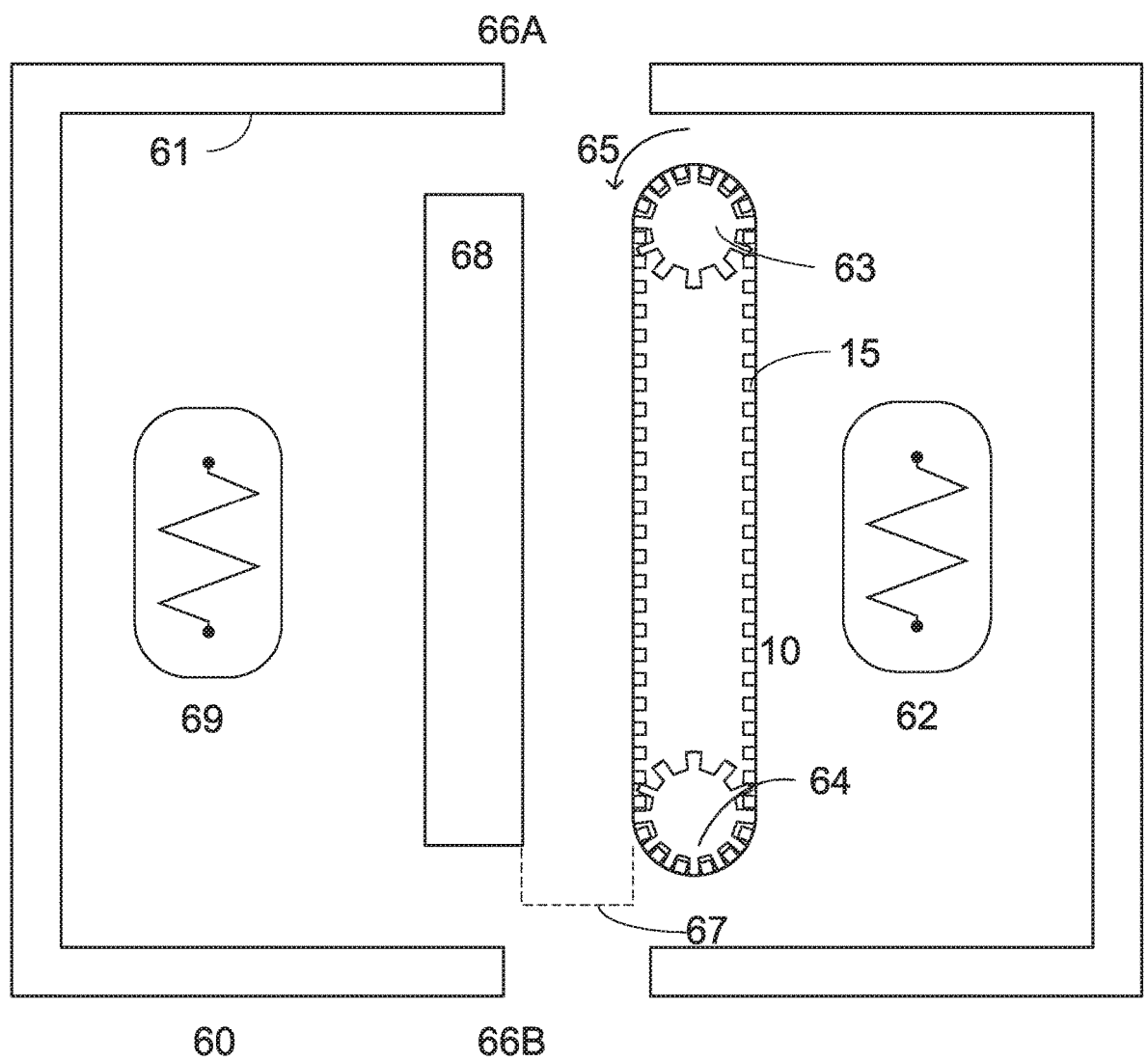
FIGS. 6A and 6B include illustrations of example cooking apparatus according to certain embodiments described herein.

FIG. 6A includes an illustration of an example cooking apparatus 60 according to embodiments described herein. As shown in FIG. 6A, a cooking apparatus 60 may include a housing 61, a heat source 62, a drive roller 63, and a composite belt 10. The drive roller 63 may be configured to rotate in a direction 65. The drive roller 63 may be engaged with nodules 15 of the composite belt 10 such that the composite belt 10 is driven to rotate in the direction 65. In some embodiments, there may be an auxiliary drive roller 64, also configured to rotate in direction 65. In other embodiments, there may be a roller in place of the auxiliary drive roller 64. In certain embodiments, the cooking apparatus may contain one or more openings 66 through which objects, such as food, may be inserted into, traversed through, and removed from the cooking apparatus 60.

In particular embodiments, the cooking apparatus may include a plate 68 located opposite the composite belt 10. The plate 68 may be located such that a gap 67 separates the composite belt 10 from the plate 68. The plate 68 may be heated by a heating element 69, which may be located near the plate 68 or inside of the plate 68. An object, the object preferably having a width approximately equal to the gap 67, may be placed through a first opening 66A such that the object lies between the composite belt 10 and the plate 68. The rotation of the composite belt 10 carries the object between the composite belt 10 and the plate 68 such that the object travels across the length of the loop of composite belt 10 until the object reaches the end of the length of the loop of composite belt 10 and the object is released through a second opening 66B.

According to still other embodiments, the composite belt 10 may form a continuous loop and the drive roller 63 may be located exterior to that loop (not shown). In such embodiments, composite belt 10 will be oriented such that the nodules 15 protrude outward away from the interior of the continuous loop of the composite belt 10.

It will be appreciated that the composite belt 10 of the cooking apparatus 60 of FIG. 6A includes a profile 11 and a belt 13 and may have any of the characteristics described herein with reference to the corresponding composite belt 10, profile 11, and belt 13 in FIG. 1, FIG. 2, FIG. 3, FIG. 4A, FIG. 4B, and FIG. 5.

Figure 6B:
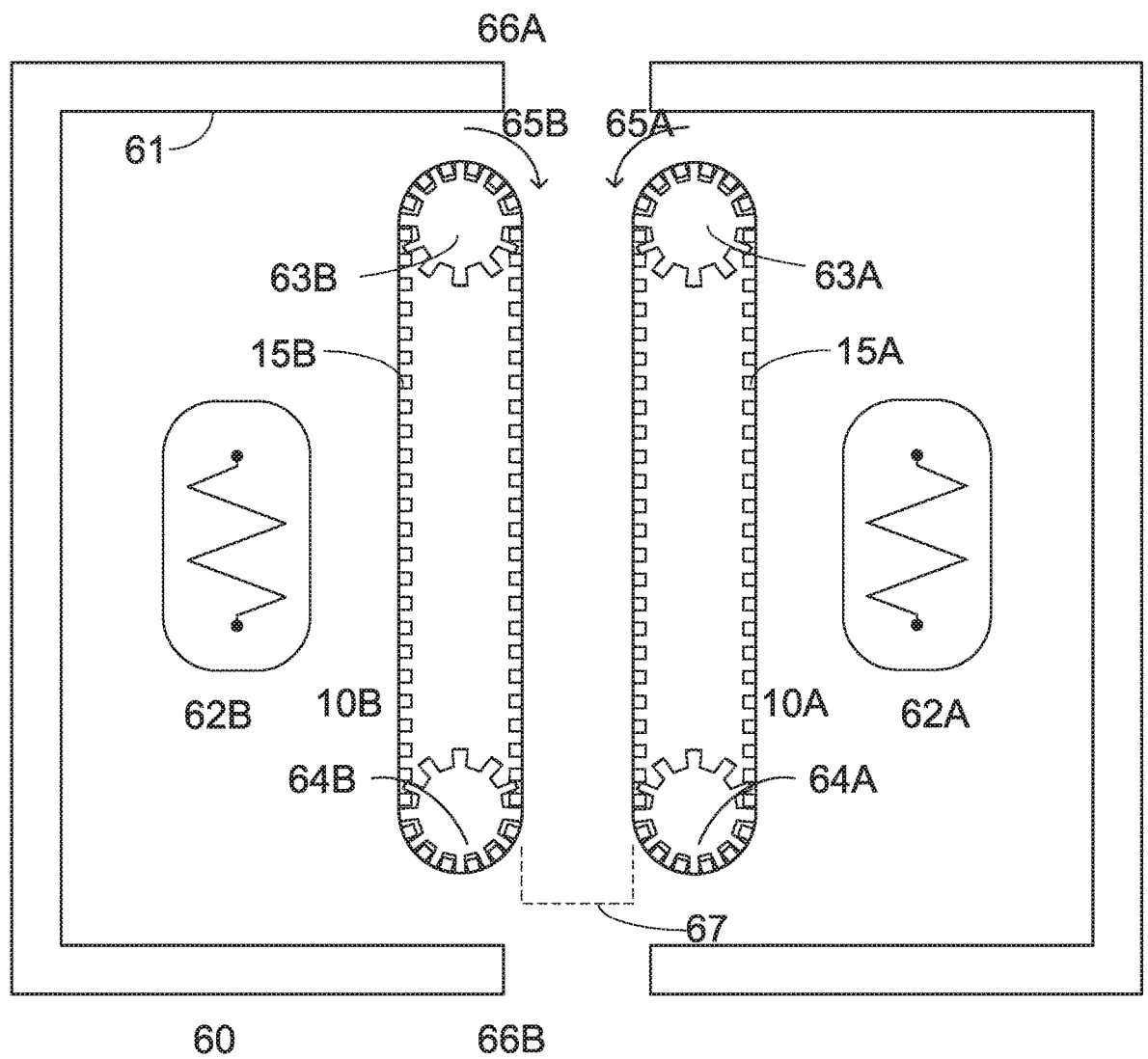

FIG. 6B includes an illustration of an example cooking apparatus 60 according to embodiments described herein. As shown in FIG. 6B, a cooking apparatus 60 may include a first housing 61A, a first heat source 62A, a first drive roller 63A, and a first composite belt 10A. The first drive roller 63A may be configured to rotate in a direction 65A. The first drive roller 63A may be engaged with first nodules 15A of the first composite belt 10A such that the first composite belt 10A is driven to rotate in direction 65A. In some embodiments, there may be a first auxiliary drive roller 64A, also configured to rotate in direction 65A. In other embodiments, there may be a roller in place of the auxiliary drive roller 64A. In particular embodiments, the cooking apparatus 60 may also include a second housing 61B, a second heat source 62B, a second drive roller 63B, and a second composite belt 10B. The second drive roller 63B may be configured to rotate in a direction 65B. The second drive roller 63B may be engaged with the second nodules 15B of the second composite belt 10B such that the second composite belt 10B is driven to rotate in direction 65B. In some embodiments, there may be a second auxiliary drive roller 64B, also configured to rotate in direction 65B. In other embodiments, there may be a roller in place of the auxiliary drive roller 64A. The composite belt 10B may be located opposite the composite belt 10A such that a gap 67 separates the composite belt 10A from the composite belt 10B. As illustrated in FIG. 6A and FIG. 6B, the composite belt 10 may be oriented to convey an object downward in the direction of gravity. In other embodiments, the composite belt 10 may be oriented to convey an object horizontally in a direction perpendicular to the direction of gravity. In still further embodiments, the composite belt 10 may be oriented to convey an object in any desired direction.

According to still other embodiments, the cooking apparatus 60 may have any number of composite belts 10 (not shown). In some embodiments, a composite belt 10 may be located opposite one or more other composite belts. In other embodiments, a composite belt 10 may be located adjacent to one or more other composite belts. In other embodiments, a composite belt 10 may be located adjacent to one or more other composite belts and opposite one or more additional composite belts. The composite belts 10 may be located such that a gap 67 exists between opposite composite belts. In certain embodiments, there may be a first gap between a first and second composite belt, and a second gap between a second and third composite belt. The gaps may be equal in distance, or the first gap may be larger than the second gap.

In certain embodiments, the cooking apparatus 60 may have a first composite belt, a second composite belt, a third composite belt, and a fourth composite belt. The first composite belt may be opposite the fourth composite belt such that a first gap exists between the first composite belt and the fourth composite belt. The second composite belt may be opposite the fourth composite belt such that a second gap exists between the second composite belt and the fourth composite belt. The third composite belt may be opposite the fourth composite belt such that a third gap exists between the third composite belt and the fourth composite belt. The first gap may have a length that is different than a length of the second gap, and the second gap may have a length that is different than a length of the third gap. In other embodiments, each gap may be equal in length.

Although not illustrated, the cooking apparatus 60 may include a number of heat sources 62 that is greater than a number of composite belts 10. For example, the cooking apparatus 60 may include two heat sources, and a first heat source may heat a first surface of the composite belt, and a second heat source may heat a second surface of the composite belt opposite the first surface.

It will be appreciated that the composite belt 10 of the cooking apparatus 60 of FIG. 6B may include a profile 11 and a belt 13 and may have any of the characteristics described herein with reference to the corresponding composite belt 10, profile 11, and belt 13 in FIG. 1, FIG. 2, FIG. 3, FIG. 4A, FIG. 4B, FIG. 5, and FIG. 6A.

Figure 7A:
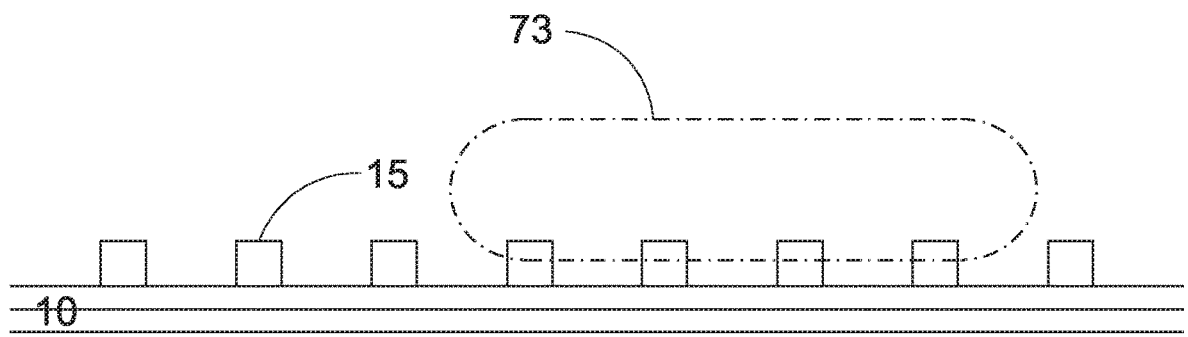
FIGS. 7A and 7B include illustrations of example composite belts within a cooking apparatus according to certain embodiments described herein.

FIG. 7A includes an illustration of an example composite belt 10 according to embodiments described herein. As shown in FIG. 7A, in particular embodiments the composite belt 10 may be located such that the nodules 15 of the composite belt 10 engage with links of a drive chain 73.

Figure 7B:
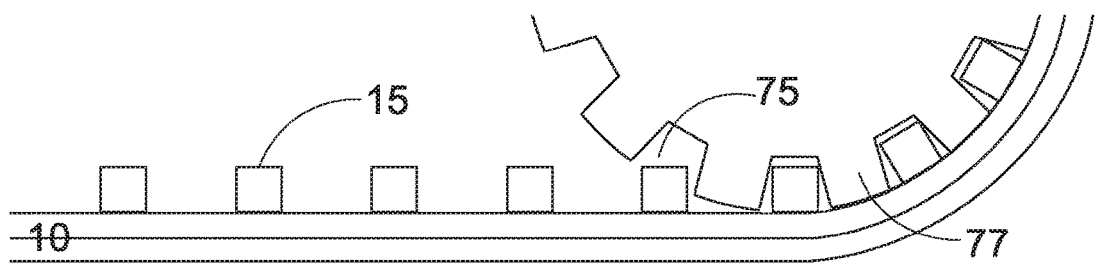

FIG. 7B includes an illustration of an example composite belt 10 according to embodiments described herein. As shown in FIG. 7B, in other embodiments the composite belt 10 may be located such that the nodules 15 of the composite belt 10 engage with apertures 75 of a drive roller 77. It will be appreciated that in certain embodiments, regardless of whether a drive chain 73, a drive roller 77, or some other drive mechanism is used, the nodules 15 may be configured to engage with the drive mechanism to maintain the composite belt 10 in alignment. It will also be appreciated that in certain embodiments, regardless of whether a drive chain 73, a drive roller 77, or some other drive mechanism is used, the nodules 15 may be configured to engage with the drive mechanism to rotate the belt. In particular embodiments, the nodules 15 may be located along the composite belt 10 at a distance that will allow the nodules to engage with the drive mechanism. For example, the distance in the longitudinal direction between two nodules 15 may be the distance between links of a drive chain 73. In other embodiments, the distance in the longitudinal direction between two nodules 15 may be the radial distance between two apertures 75 in a drive roller 77.

It will be appreciated that the composite belt 10 of FIG. 7A and the composite belt 10 of FIG. 7B include a profile 11 and a belt 13 and, accordingly, may have any of the characteristics described herein with reference to the corresponding composite belt 10, profile 11, and belt 13 in FIG. 1, FIG. 2, FIG. 3, FIG. 4A, FIG. 4B, FIG. 5, FIG. 6A, and FIG. 6B. It will also be appreciated that the drive chain 73 of FIG. 7A and the drive roller 77 of FIG. 7B may be used with any composite belt 10 in FIG. 1, FIG. 2, FIG. 3, FIG. 4A, FIG. 4B, FIG. 5, FIG. 6A, and FIG. 6B.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A composite belt comprising: a profile, and a belt; wherein the profile comprises: a strip, and nodules; and wherein the profile is attached to the belt such that each nodule extends out from the belt.

Embodiment 2

The composite belt of embodiment 1, wherein the profile comprises a polymer.

Embodiment 3

The composite belt of embodiment 1, wherein the profile consists of a polymer.

Embodiment 4

The composite belt of embodiment 1, wherein the profile comprises an elastomer.

Embodiment 5

The composite belt of embodiment 1, wherein the profile consists of an elastomer.

Embodiment 6

The composite belt of embodiment 1, wherein the profile comprises a silicone-based material.

Embodiment 7

The composite belt of embodiment 1, wherein the profile consists of a silicone-based material.

Embodiment 8

The composite belt of embodiment 1, wherein the profile comprises a silicone-based polymer.

Embodiment 9

The composite belt of embodiment 1, wherein the profile consists of a silicone-based polymer.

Embodiment 10

The composite belt of embodiment 1, wherein the profile comprises a polysiloxane.

Embodiment 11

The composite belt of embodiment 1, wherein the profile consists of a polysiloxane.

Embodiment 12

The composite belt of embodiment 1, wherein the profile consists of a fluoropolymer.

Embodiment 13

The composite belt of embodiment 1, wherein the profile comprises a fluoropolymer.

Embodiment 14

The composite belt of embodiment 1, wherein the profile comprises a perfluoropolymer.

Embodiment 15

The composite belt of embodiment 1, wherein the profile consists of a perfluoropolymer.

Embodiment 16

The composite belt of embodiment 1, wherein the profile comprises a polytetrafluoroethylene.

Embodiment 17

The composite belt of embodiment 1, wherein the profile consists of a polytetrafluoroethylene.

Embodiment 18

The composite belt of embodiment 1, wherein the profile comprises a food grade material.

Embodiment 19

The composite belt of embodiment 1, wherein the profile consists of food grade material.

Embodiment 20

The composite belt of embodiment 1, wherein the profile comprises a combination of two or more of a polymer, an elastomer, a silicone-based material, a silicone-based polymer, a polysiloxane, a fluoropolymer, a perfluoropolymer, a polytetrafluoroethylene, and a food grade material.

Embodiment 21

The composite belt of embodiment 1, wherein the profile consists of a combination of two or more of a polymer, an elastomer, a silicone-based material, a silicone-based polymer, a polysiloxane, a fluoropolymer, a perfluoropolymer, a polytetrafluoroethylene, and a food grade material.

Embodiment 22

The composite belt of embodiment 1, wherein the strip has a width of not greater than 5 cm, or not greater than 4 cm, or not greater than 3 cm, or not greater than 2.5 cm, or not greater than 2.2 cm, or not greater than 2 cm, or not greater than 1.9 cm, or not greater than 1.8 cm, or not greater than 1.7 cm, or not greater than 1.6 cm, or not greater than 1.5 cm, or not greater than 1.4 cm, or not greater than 1.3 cm, or not greater than 1.2 cm, or not greater than 1.1 cm, or not greater than 1 cm, or not greater than 0.9 cm, or not greater than 0.8 cm, or not greater than 0.5 cm, or not greater than 0.2 cm.

Embodiment 23

The composite belt of embodiment 1, wherein the strip has a width of at least 0.1 cm, or at least 0.2 cm, or at least 0.5 cm, or at least 0.8 cm, or at least 0.9 cm, or at least 1 cm, or at least 1.1 cm, or at least 1.2 cm, or at least 1.3 cm, or at least 1.4 cm, or at least 1.5 cm, or at least 1.6 cm, or at least 1.7 cm, or at least 1.8 cm, or at least 1.9 cm, or at least 2 cm, or at least 2.5 cm, or at least 3 cm, or at least 4 cm.

Embodiment 24

The composite belt of embodiment 1, wherein the strip has a width of not greater than 20% of the width of the belt, or not greater than 18% of the width of the belt, or not greater than 16% of the width of the belt, or not greater than 15% of the width of the belt, or not greater than 14% of the width of the belt, or not greater than 13% of the width of the belt, or not greater than 12% of the width of the belt, or not greater than 11% of the width of the belt, or not greater than 10% of the width of the belt, or not greater than 9% of the width of the belt, or not greater than 8% of the width of the belt, or not greater than 7% of the width of the belt, or not greater than 6% of the width of the belt, or not greater than 5% of the width of the belt or not greater than 4% of the width of the belt, or not greater than 3.5% of the width of the belt, or not greater than 3% of the width of the belt, or not greater than 2.5% of the width of the belt, or not greater than 2% of the width of the belt or not greater than 1% of the width of the belt.

Embodiment 25

The composite belt of embodiment 1, wherein the strip has a width of at least 1% of the width of the belt or at least 2% of the width of the belt, or at least 2.5% of the width of the belt, or at least 3% of the width of the belt, or at least 3.5% of the width of the belt, or at least 4% of the width of the belt or at least 5% of the width of the belt, or at least 6% of the width of the belt, or at least 7% of the width of the belt, or at least 8% of the width of the belt, or at least 9% of the width of the belt, or at least 10% of the width of the belt, or at least 11% of the width of the belt, or at least 12% of the width of the belt, or at least 13% of the width of the belt, or at least 14% of the width of the belt, or at least 15% of the width of the belt, or at least 16% of the width of the belt, or at least 18% of the width of the belt.

Embodiment 26

The composite belt of embodiment 1, wherein the strip has a length of not greater than 500 cm, or not greater than 450 cm, or not greater than 400 cm, or not greater than 350 cm, or not greater than 300 cm, or not greater than 250 cm, or not greater than 200 cm, or not greater than 180 cm, or not greater than 160 cm, or not greater than 140 cm, or not greater than 120 cm, or not greater than 100 cm, or not greater than 90 cm, or not greater than 85 cm, or not greater than 80 cm, or not greater than 75 cm, or not greater than 70 cm, or not greater than 60 cm, or not greater than 50 cm, or not greater than 40 cm, or not greater than 30 cm, or not greater than 20 cm.

Embodiment 27

The composite belt of embodiment 1, wherein the strip has a length of at least 10 cm, or at least 20 cm, or at least 30 cm, or at least 40 cm, or at least 50 cm, or at least 60 cm, or at least 70 cm, or at least 75 cm, or at least 80 cm, or at least 85 cm, or at least 90 cm, or at least 100 cm, or at least 120 cm, or at least 140 cm, or at least 160 cm, or at least 180 cm, or at least 200 cm, or at least 250 cm, or at least 300 cm, or at least 350 cm, or at least 400 cm, or at least 450 cm.

Embodiment 28

The composite belt of embodiment 1, wherein the strip has a length of not greater than 100% of the length of the belt, or not greater than 98% of the length of the belt, or not greater than 95% of the length of the belt, or not greater than 90% of the length of the belt, or not greater than 85% of the length of the belt, or not greater than 80% of the length of the belt, or not greater than 75% of the length of the belt, or not greater than 70% of the length of the belt, or not greater than 65% of the length of the belt, or not greater than 60% of the length of the belt, or not greater than 55% of the length of the belt, or not greater than 50% of the length of the belt, or not greater than 45% of the length of the belt, or not greater than 40% of the length of the belt, or not greater than 35% of the length of the belt, or not greater than 30% of the length of the belt, or not greater than 25% of the length of the belt, or not greater than 20% of the length of the belt, or not greater than 15% of the length of the belt, or not greater than 10% of the length of the belt.

Embodiment 29

The composite belt of embodiment 1, wherein the strip has a length of at least 5% of the length of the belt, or at least 10% of the length of the belt, or at least 15% of the length of the belt, or at least 20% of the length of the belt, or at least 25% of the length of the belt, or at least 30% of the length of the belt, or at least 35% of the length of the belt, or at least 40% of the length of the belt, or at least 45% of the length of the belt, or at least 50% of the length of the belt, or at least 55% of the length of the belt, or at least 60% of the length of the belt, or at least 65% of the length of the belt, or at least 70% of the length of the belt, or at least 75% of the length of the belt, or at least 80% of the length of the belt, or at least 85% of the length of the belt, or at least 90% of the length of the belt, or at least 95% of the length of the belt, or at least 98% of the length of the belt.

Embodiment 30

The composite belt of embodiment 1, wherein the nodules are radially symmetric.

Embodiment 31

The composite belt of embodiment 1, wherein the nodules are cylindrical.

Embodiment 32

The composite belt of embodiment 1, wherein the nodules are bulbous.

Embodiment 33

The composite belt of embodiment 1, wherein the nodules have a maximum diameter of not greater than 50 mm, or not greater than 40 mm, or not greater than 30 mm, or not greater than 25 mm, or not greater than 20 mm, or not greater than 15 mm, or not greater than 10 mm, or not greater than 8 mm, or not greater than 6 mm, or not greater than 5.5 mm, or not greater than 5 mm, or not greater than 4.9 mm, or not greater than 4.8 mm, or not greater than 4.7 mm, or not greater than 4.6 mm, or not greater than 4.5 mm, or not greater than 4.4 mm, or not greater than 4.3 mm, or not greater than 4.2 mm, or not greater than 4.1 mm, or not greater than 4 mm, or not greater than 3.9 mm, or not greater than 3.8 mm, or not greater than 3.7 mm, or not greater than 3.5 mm, or not greater than 3.3 mm or not greater than 3 mm or not greater than 2.5 mm or not greater than 2 mm or not greater than 1 mm.

Embodiment 34

The composite belt of embodiment 1, wherein the nodules have a maximum diameter of at least 0.5 mm, or at least 1 mm or at least 2 mm or at least 2.5 mm or at least 3 mm or at least 3.3 mm, or at least 3.5 mm, or at least 3.7 mm, or at least 3.8 mm, or at least 3.9 mm, or at least 4 mm, or at least 4.1 mm, or at least 4.2 mm, or at least 4.3 mm, or at least 4.4 mm, or at least 4.5 mm, or at least 4.6 mm, or at least 4.7 mm, or at least 4.8 mm, or at least 4.9 mm, or at least 5 mm, or at least 5.5 mm, or at least 6 mm, or at least 8 mm, or at least 10 mm, or at least 15 mm, or at least 20 mm, or at least 25 mm, or at least 30 mm, or at least 40 mm.

Embodiment 35

The composite belt of embodiment 1, wherein the nodules have a maximum circumference of not greater than 160 mm, or not greater than 125 mm or not greater than 100 mm, or not greater than 80 mm, or not greater than 60 mm or not greater than 45 mm, or not greater than 30 mm, or not greater than 25 mm, or not greater than 20 mm, or not greater than 18 mm, or not greater than 17 mm, or not greater than 16 mm, or not greater than 15 mm, or not greater than 14 mm, or not greater than 13 mm, or not greater than 12 mm, or not greater than 11 mm, or not greater than 10 mm or not greater than 8 mm or not greater than 5 mm.

Embodiment 36

The composite belt of embodiment 1, wherein the nodules have a maximum circumference of at least 1 mm or at least 5 mm or at least 8 mm or at least 10 mm, or at least 11 mm, or at least 12 mm, or at least 13 mm, or at least 14 mm, or at least 15 mm, or at least 16 mm, or at least 17 mm, or at least 18 mm, or at least 20 mm, or at least 25 mm, or at least 30 mm, or at least 45 mm or at least 60 mm, or at least 80 mm, or at least 100 mm or at least 125 mm.

Embodiment 37

The composite belt of embodiment 1, wherein the nodules have a height of not greater than 25 mm, or not greater than 20 mm, or not greater than 15 mm, or not greater than 10 mm, or not greater than 9 mm, or not greater than 8 mm, or not greater than 7 mm, or not greater than 6 mm, or not greater than 5 mm, or not greater than 4 mm, or not greater than 3.8 mm, or not greater than 3.6 mm, or not greater than 3.5 mm, or not greater than 3.4 mm, or not greater than 3.3 mm, or not greater than 3.2 mm, or not greater than 3.1 mm, or not greater than 3 mm, or not greater than 2.9 mm, or not greater than 2.8 mm, or not greater than 2.7 mm, or not greater than 2.6 mm, or not greater than 2.5 mm, or not greater than 2.3 mm, or not greater than 2 mm, or not greater than 1.5 mm.

Embodiment 38

The composite belt of embodiment 1, wherein the nodules have a height of at least 1 mm, or at least 1.5 mm, or at least 2 mm, or at least 2.3 mm, or at least 2.5 mm, or at least 2.6 mm, or at least 2.7 mm, or at least 2.8 mm, or at least 2.9 mm, or at least 3 mm, or at least 3.1 mm, or at least 3.2 mm, or at least 3.3 mm, or at least 3.4 mm, or at least 3.5 mm, or at least 3.6 mm, or at least 3.8 mm, or at least 4 mm, or at least 5 mm, or at least 6 mm, or at least 7 mm, or at least 8 mm, or at least 9 mm, or at least 10 mm, or at least 15 mm, or at least 20 mm.

Embodiment 39

The composite belt of embodiment 1, wherein the belt comprises a polymer.

Embodiment 40

The composite belt of embodiment 1, wherein the belt consists of a polymer.

Embodiment 41

The composite belt of embodiment 1, wherein the belt comprises an elastomer.

Embodiment 42

The composite belt of embodiment 1, wherein the belt consists of an elastomer.

Embodiment 43

The composite belt of embodiment 1, wherein the belt comprises a silicone-based material.

Embodiment 44

The composite belt of embodiment 1, wherein the belt consists of a silicone-based material.

Embodiment 45

The composite belt of embodiment 1, wherein the belt comprises a silicone-based polymer.

Embodiment 46

The composite belt of embodiment 1, wherein the belt consists of a silicone-based polymer.

Embodiment 47

The composite belt of embodiment 1, wherein the belt comprises a polysiloxane.

Embodiment 48

The composite belt of embodiment 1, wherein the belt consists of a polysiloxane.

Embodiment 49

The composite belt of embodiment 1, wherein the belt consists of a fluoropolymer.

Embodiment 50

The composite belt of embodiment 1, wherein the belt comprises a fluoropolymer.

Embodiment 51

The composite belt of embodiment 1, wherein the belt comprises a perfluoropolymer.

Embodiment 52

The composite belt of embodiment 1, wherein the belt consists of a perfluoropolymer.

Embodiment 53

The composite belt of embodiment 1, wherein the belt comprises a polytetrafluoroethylene.

Embodiment 54

The composite belt of embodiment 1, wherein the belt consists of a polytetrafluoroethylene.

Embodiment 55

The composite belt of embodiment 1, wherein the belt comprises a food grade material.

Embodiment 56

The composite belt of embodiment 1, wherein the belt consists of food grade material.

Embodiment 57

The composite belt of embodiment 1, wherein the belt comprises a combination of two or more of a polymer, an elastomer, a silicone-based material, a silicone-based polymer, a polysiloxane, a fluoropolymer, a perfluoropolymer, a polytetrafluoroethylene, and a food grade material.

Embodiment 58

The composite belt of embodiment 1, wherein the belt consists of a combination of two or more of a polymer, an elastomer, a silicone-based material, a silicone-based polymer, a polysiloxane, a fluoropolymer, a perfluoropolymer, a polytetrafluoroethylene, and a food grade material.

Embodiment 59

The composite belt of embodiment 1, wherein the belt comprises a fiber.

Embodiment 60

The composite belt of embodiment 1, wherein the belt comprises a fiber, wherein the fiber comprises a mineral fiber.

Embodiment 61

The composite belt of embodiment 1, wherein the belt comprises a fiber, wherein the fiber consists of a mineral fiber.

Embodiment 62

The composite belt of embodiment 1, wherein the belt comprises a fiber, wherein the fiber comprises a mineral fiber, wherein the mineral fiber comprises a glass.

Embodiment 63

The composite belt of embodiment 1, wherein the belt comprises a fiber, wherein the fiber comprises a mineral fiber, wherein the mineral fiber consists of a glass.

Embodiment 64

The composite belt of embodiment 1, wherein the belt comprises a fiber, wherein the fiber comprises a mineral fiber, wherein the mineral fiber comprises a quartz.

Embodiment 65

The composite belt of embodiment 1, wherein the belt comprises a fiber, wherein the fiber comprises a mineral fiber, wherein the mineral fiber consists of a quartz.

Embodiment 66

The composite belt of embodiment 1, wherein the belt comprises a fiber, wherein the fiber comprises a mineral fiber, wherein the mineral fiber comprises a silica.

Embodiment 67

The composite belt of embodiment 1, wherein the belt comprises a fiber, wherein the fiber comprises a mineral fiber, wherein the mineral fiber consists of a silica.

Embodiment 68

The composite belt of embodiment 1, wherein the belt comprises a fiber, wherein the fiber comprises a mineral fiber, wherein the mineral fiber comprises a combination of two or more of a glass, a quartz, and a silica.

Embodiment 69

The composite belt of embodiment 1, wherein the belt comprises a fiber, wherein the fiber comprises a mineral fiber, wherein the mineral fiber consists of a combination of two or more of a glass, a quartz, and a silica.

Embodiment 70

The composite belt of embodiment 1, wherein the belt comprises a fiber, wherein the fiber comprises an organic fiber.

Embodiment 71

The composite belt of embodiment 1, wherein the belt comprises a fiber, wherein the fiber consists of an organic fiber.

Embodiment 72

The composite belt of embodiment 1, wherein the belt comprises a fiber, wherein the fiber comprises an organic fiber, wherein the organic fiber comprises a polyester.

Embodiment 73

The composite belt of embodiment 1, wherein the belt comprises a fiber, wherein the fiber comprises an organic fiber, wherein the organic fiber consists of a polyester.

Embodiment 74

The composite belt of embodiment 1, wherein the belt comprises a fiber, wherein the fiber comprises an organic fiber, wherein the organic fiber comprises a polyethylene.

Embodiment 75

The composite belt of embodiment 1, wherein the belt comprises a fiber, wherein the fiber comprises an organic fiber, wherein the organic fiber consists of a polyethylene.

Embodiment 76

The composite belt of embodiment 1, wherein the belt comprises a fiber, wherein the fiber comprises an organic fiber, wherein the organic fiber comprises a polyamide.

Embodiment 77

The composite belt of embodiment 1, wherein the belt comprises a fiber, wherein the fiber comprises an organic fiber, wherein the organic fiber consists of a polyamide.

Embodiment 78

The composite belt of embodiment 1, wherein the belt comprises a fiber, wherein the fiber comprises an organic fiber, wherein the organic fiber comprises an aramid.

Embodiment 79

The composite belt of embodiment 1, wherein the belt comprises a fiber, wherein the fiber comprises an organic fiber, wherein the organic fiber consists of an aramid.

Embodiment 80

The composite belt of embodiment 1, wherein the belt comprises a fiber, wherein the fiber comprises an organic fiber, wherein the organic fiber comprises a polymethyl methacrylate.

Embodiment 81

The composite belt of embodiment 1, wherein the belt comprises a fiber, wherein the fiber comprises an organic fiber, wherein the organic fiber consists of a polymethyl methacrylate.

Embodiment 82

The composite belt of embodiment 1, wherein the belt comprises a fiber, wherein the fiber comprises an organic fiber, wherein the organic fiber comprises a polycarbonate.

Embodiment 83

The composite belt of embodiment 1, wherein the belt comprises a fiber, wherein the fiber comprises an organic fiber, wherein the organic fiber consists of a polycarbonate.

Embodiment 84

The composite belt of embodiment 1, wherein the belt comprises a fiber, wherein the fiber comprises an organic fiber, wherein the organic fiber comprises a cycloolefin.

Embodiment 85

The composite belt of embodiment 1, wherein the belt comprises a fiber, wherein the fiber comprises an organic fiber, wherein the organic fiber consists of a cycloolefin.

Embodiment 86

The composite belt of embodiment 1, wherein the belt comprises a fiber, wherein the fiber comprises an organic fiber, wherein the organic fiber comprises a fluoropolymer.

Embodiment 87

The composite belt of embodiment 1, wherein the belt comprises a fiber, wherein the fiber comprises an organic fiber, wherein the organic fiber consists of a fluoropolymer.

Embodiment 88

The composite belt of embodiment 1, wherein the belt comprises a fiber, wherein the fiber comprises an organic fiber, wherein the organic fiber comprises a carbon fiber.

Embodiment 89

The composite belt of embodiment 1, wherein the belt comprises a fiber, wherein the fiber comprises an organic fiber, wherein the organic fiber consists of a carbon fiber.

Embodiment 90

The composite belt of embodiment 1, wherein the belt comprises a fiber, wherein the fiber comprises an organic fiber, wherein the organic fiber comprises a combination of two or more of a polyester, a polyethylene, a polyamide, an aramid, a polymethyl methacrylate, a polycarbonate, a cycloolefin, a fluoropolymer, and a carbon fiber.

Embodiment 91

The composite belt of embodiment 1, wherein the belt comprises a fiber, wherein the fiber comprises an organic fiber, wherein the organic fiber consists of a combination of two or more of a polyester, a polyethylene, a polyamide, an aramid, a polymethyl methacrylate, a polycarbonate, a cycloolefin, a fluoropolymer, and a carbon fiber.

Embodiment 92

The composite belt of embodiment 1, wherein the belt comprises a fiber, wherein the fiber comprises a composite fiber, wherein the composite fiber comprises a combination of mineral and organic fibers.

Embodiment 93

The composite belt of embodiment 1, wherein the belt consists of a fiber, wherein the fiber comprises a composite fiber, wherein the composite fiber consists of a combination of mineral and organic fibers.

Embodiment 94

The composite belt of embodiment 1, wherein the composite belt comprises a food grade material.

Embodiment 95

The composite belt of embodiment 1, wherein the composite belt consists of food grade material.

Embodiment 96

The composite belt of embodiment 1, wherein the belt has a length of not greater than 500 cm, or not greater than 450 cm, or not greater than 400 cm, or not greater than 350 cm, or not greater than 300 cm, or not greater than 250 cm, or not greater than 200 cm, or not greater than 150 cm, or not greater than 125 cm, or not greater than 100 cm, or not greater than 90 cm, or not greater than 85 cm, or not greater than 80 cm, or not greater than 75 cm, or not greater than 70 cm, or not greater than 60 cm, or not greater than 50 cm, or not greater than 40 cm, or not greater than 30 cm, or not greater than 20 cm.

Embodiment 97

The composite belt of embodiment 1, wherein the belt has a length of at least 10 cm, or at least 20 cm, or at least 30 cm, or at least 40 cm, or at least 50 cm, or at least 60 cm, or at least 70 cm, or at least 75 cm, or at least 80 cm, or at least 85 cm, or at least 90 cm, or at least 100 cm, or at least 125 cm, or at least 150 cm, or at least 200 cm, or at least 250 cm, or at least 300 cm, or at least 350 cm, or at least 400 cm, or at least 450 cm.

Embodiment 98

The composite belt of embodiment 1, wherein the belt has a width of not greater than 200 cm, or not greater than 175 cm, or not greater than 150 cm, or not greater than 125 cm, or not greater than 100 cm, or not greater than 90 cm, or not greater than 80 cm, or not greater than 75 cm, or not greater than 70 cm, or not greater than 65 cm, or not greater than 60 cm, or not greater than 55 cm, or not greater than 50 cm, or not greater than 45 cm, or not greater than 40 cm, or not greater than 35 cm, or not greater than 30 cm, or not greater than 25 cm, or not greater than 20 cm, or not greater than 18 cm, or not greater than 16 cm, or not greater than 15 cm, or not greater than 14 cm, or not greater than 13 cm, or not greater than 12 cm, or not greater than 11 cm, or not greater than 10 cm.

Embodiment 99

The composite belt of embodiment 1, wherein the belt has a width of at least 5 cm, or at least 10 cm, or at least 11 cm, or at least 12 cm, or at least 13 cm, or at least 14 cm, or at least 15 cm, or at least 16 cm, or at least 18 cm, or at least 20 cm, or at least 25 cm, or at least 30 cm, or at least 35 cm, or at least 40 cm, or at least 45 cm, or at least 50 cm, or at least 55 cm, or at least 60 cm, or at least 65 cm, or at least 70 cm, or at least 75 cm, or at least 80 cm, or at least 90 cm, or at least 100 cm, or at least 125 cm, or at least 150 cm, or at least 175 cm.

Embodiment 100

The composite belt of embodiment 1, wherein the belt has a thickness of not greater than 4 mm, or not greater than 3 mm, or not greater than 2 mm, or not greater than 1.5 mm, or not greater than 1 mm, or not greater than 0.9 mm, or not greater than 0.8 mm, or not greater than 0.7 mm, or not greater than 0.6 mm, or not greater than 0.5 mm, or not greater than 0.4 mm, or not greater than 0.3 mm, or not greater than 0.25 mm, or not greater than 0.2 mm, or not greater than 0.18 mm, or not greater than 0.16 mm, or not greater than 0.14 mm, or not greater than 0.13 mm, or not greater than 0.12 mm, or not greater than 0.11 mm, or not greater than 0.1 mm, or not greater than 0.09 mm, or not greater than 0.08 mm, or not greater than 0.07 mm, or not greater than 0.06 mm, or not greater than 0.05 mm, or not greater than 0.04 mm, or not greater than 0.03 mm, or not greater than 0.02 mm.

Embodiment 101

The composite belt of embodiment 1, wherein the belt has a thickness of at least 0.01 mm, or at least 0.02 mm, or at least 0.03 mm, or at least 0.04 mm, or at least 0.05 mm, or at least 0.06 mm, or at least 0.07 mm, or at least 0.08 mm, or at least 0.09 mm, or at least 0.1 mm, or at least 0.11 mm, or at least 0.12 mm, or at least 0.13 mm, or at least 0.14 mm, or at least 0.16 mm, or at least 0.18 mm, or at least 0.2 mm, or at least 0.25 mm, or at least 0.3 mm, or at least 0.4 mm, or at least 0.5 mm, or at least 0.6 mm, or at least 0.7 mm, or at least 0.8 mm, or at least 0.9 mm, or at least 1 mm, or at least 1.5 mm, or at least 2 mm, or at least 3 mm.

Embodiment 102

The composite belt of embodiment 1, wherein the belt forms a continuous loop.

Embodiment 103

The composite belt of embodiment 1, wherein the nodules and the strip comprise a single unit.

Embodiment 104

The composite belt of embodiment 1, wherein each nodule protrudes through the belt.

Embodiment 105

The composite belt of embodiment 1, wherein the profile comprises a surface adjacent the nodules, and wherein the profile is attached to the belt at the surface adjacent the nodules.

Embodiment 106

The composite belt of embodiment 1, wherein the profile comprises a surface opposite the nodules, and wherein the profile is attached to the belt at the surface opposite the nodules.

Embodiment 107

The composite belt of embodiment 1, wherein the profile is attached to the belt by a staple.

Embodiment 108

The composite belt of embodiment 1, wherein the profile is attached to the belt by a rivet.

Embodiment 109

The composite belt of embodiment 1, wherein the profile is attached to the belt by a separable fastening device.

Embodiment 110

The composite belt of embodiment 1, wherein the profile is attached to the belt by a heat seal.

Embodiment 111

The composite belt of embodiment 1, wherein the profile is attached to the belt by a weld.

Embodiment 112

The composite belt of embodiment 1, wherein the profile is attached to the belt by a radio frequency weld.

Embodiment 113

The composite belt of embodiment 1, wherein the profile is attached to the belt by a stitching material.

Embodiment 114

The composite belt of embodiment 1, wherein the profile is attached to the belt by a stitching material, wherein the stitching material comprises a thread.

Embodiment 115

The composite belt of embodiment 1, wherein the profile is attached to the belt by a stitching material, wherein the stitching material comprises a thread, wherein the thread comprises a mineral fiber.

Embodiment 116

The composite belt of embodiment 1, wherein the profile is attached to the belt by a stitching material, wherein the stitching material comprises a thread, wherein the thread consists of a mineral fiber.

Embodiment 117

The composite belt of embodiment 1, wherein the profile is attached to the belt by a stitching material, wherein the stitching material comprises a thread, wherein the thread comprises a mineral fiber, wherein the mineral fiber comprises a glass.

Embodiment 118

The composite belt of embodiment 1, wherein the profile is attached to the belt by a stitching material, wherein the stitching material comprises a thread, wherein the thread comprises a mineral fiber, wherein the mineral fiber consists of a glass.

Embodiment 119

The composite belt of embodiment 1, wherein the profile is attached to the belt by a stitching material, wherein the stitching material comprises a thread, wherein the thread comprises a mineral fiber, wherein the mineral fiber comprises a quartz.

Embodiment 120

The composite belt of embodiment 1, wherein the profile is attached to the belt by a stitching material, wherein the stitching material comprises a thread, wherein the thread comprises a mineral fiber, wherein the mineral fiber consists of a quartz.

Embodiment 121

The composite belt of embodiment 1, wherein the profile is attached to the belt by a stitching material, wherein the stitching material comprises a thread, wherein the thread comprises a mineral fiber, wherein the mineral fiber comprises a silica.

Embodiment 122

The composite belt of embodiment 1, wherein the profile is attached to the belt by a stitching material, wherein the stitching material comprises a thread, wherein the thread comprises a mineral fiber, wherein the mineral fiber consists of a silica.

Embodiment 123

The composite belt of embodiment 1, wherein the profile is attached to the belt by a stitching material, wherein the stitching material comprises a thread, wherein the thread comprises a mineral fiber, wherein the mineral fiber comprises a combination of two or more of a glass, a quartz, and a silica.

Embodiment 124

The composite belt of embodiment 1, wherein the profile is attached to the belt by a stitching material, wherein the stitching material comprises a thread, wherein the thread comprises a mineral fiber, wherein the mineral fiber consists of a combination of two or more of a glass, a quartz, and a silica.

Embodiment 125

The composite belt of embodiment 1, wherein the profile is attached to the belt by a stitching material, wherein the stitching material comprises a thread, wherein the thread comprises an organic fiber.

Embodiment 126

The composite belt of embodiment 1, wherein the profile is attached to the belt by a stitching material, wherein the stitching material comprises a thread, wherein the thread consists of an organic fiber.

Embodiment 127

The composite belt of embodiment 1, wherein the profile is attached to the belt by a stitching material, wherein the stitching material comprises a thread, wherein the thread comprises an organic fiber, wherein the organic fiber comprises a polyester.

Embodiment 128

The composite belt of embodiment 1, wherein the profile is attached to the belt by a stitching material, wherein the stitching material comprises a thread, wherein the thread comprises an organic fiber, wherein the organic fiber consists of a polyester.

Embodiment 129

The composite belt of embodiment 1, wherein the profile is attached to the belt by a stitching material, wherein the stitching material comprises a thread, wherein the thread comprises an organic fiber, wherein the organic fiber comprises a polyethylene.

Embodiment 130

The composite belt of embodiment 1, wherein the profile is attached to the belt by a stitching material, wherein the stitching material comprises a thread, wherein the thread comprises an organic fiber, wherein the organic fiber consists of a polyethylene.

Embodiment 131

The composite belt of embodiment 1, wherein the profile is attached to the belt by a stitching material, wherein the stitching material comprises a thread, wherein the thread comprises an organic fiber, wherein the organic fiber comprises a polyamide.

Embodiment 132

The composite belt of embodiment 1, wherein the profile is attached to the belt by a stitching material, wherein the stitching material comprises a thread, wherein the thread comprises an organic fiber, wherein the organic fiber consists of a polyamide.

Embodiment 133

The composite belt of embodiment 1, wherein the profile is attached to the belt by a stitching material, wherein the stitching material comprises a thread, wherein the thread comprises an organic fiber, wherein the organic fiber comprises an aramid.

Embodiment 134

The composite belt of embodiment 1, wherein the profile is attached to the belt by a stitching material, wherein the stitching material comprises a thread, wherein the thread comprises an organic fiber, wherein the organic fiber consists of an aramid.

Embodiment 135

The composite belt of embodiment 1, wherein the profile is attached to the belt by a stitching material, wherein the stitching material comprises a thread, wherein the thread comprises an organic fiber, wherein the organic fiber comprises a polymethyl methacrylate.

Embodiment 136

The composite belt of embodiment 1, wherein the profile is attached to the belt by a stitching material, wherein the stitching material comprises a thread, wherein the thread comprises an organic fiber, wherein the organic fiber consists of a polymethyl methacrylate.

Embodiment 137

The composite belt of embodiment 1, wherein the profile is attached to the belt by a stitching material, wherein the stitching material comprises a thread, wherein the thread comprises an organic fiber, wherein the organic fiber comprises a polycarbonate.

Embodiment 138

The composite belt of embodiment 1, wherein the profile is attached to the belt by a stitching material, wherein the stitching material comprises a thread, wherein the thread comprises an organic fiber, wherein the organic fiber consists of a polycarbonate.

Embodiment 139

The composite belt of embodiment 1, wherein the profile is attached to the belt by a stitching material, wherein the stitching material comprises a thread, wherein the thread comprises an organic fiber, wherein the organic fiber comprises a cycloolefin.

Embodiment 140

The composite belt of embodiment 1, wherein the profile is attached to the belt by a stitching material, wherein the stitching material comprises a thread, wherein the thread comprises an organic fiber, wherein the organic fiber consists of a cycloolefin.

Embodiment 141

The composite belt of embodiment 1, wherein the profile is attached to the belt by a stitching material, wherein the stitching material comprises a thread, wherein the thread comprises an organic fiber, wherein the organic fiber comprises a fluoropolymer.

Embodiment 142

The composite belt of embodiment 1, wherein the profile is attached to the belt by a stitching material, wherein the stitching material comprises a thread, wherein the thread comprises an organic fiber, wherein the organic fiber consists of a fluoropolymer.

Embodiment 143

The composite belt of embodiment 1, wherein the profile is attached to the belt by a stitching material, wherein the stitching material comprises a thread, wherein the thread comprises an organic fiber, wherein the organic fiber comprises a polytetrafluoroethylene.

Embodiment 144

The composite belt of embodiment 1, wherein the profile is attached to the belt by a stitching material, wherein the stitching material comprises a thread, wherein the thread comprises an organic fiber, wherein the organic fiber consists of a polytetrafluoroethylene.

Embodiment 145

The composite belt of embodiment 1, wherein the profile is attached to the belt by a stitching material, wherein the stitching material comprises a thread, wherein the thread comprises an organic fiber, wherein the organic fiber comprises a carbon fiber.

Embodiment 146

The composite belt of embodiment 1, wherein the profile is attached to the belt by a stitching material, wherein the stitching material comprises a thread, wherein the thread comprises an organic fiber, wherein the organic fiber consists of a carbon fiber.

Embodiment 147

The composite belt of embodiment 1, wherein the profile is attached to the belt by a stitching material, wherein the stitching material comprises a thread, wherein the thread comprises an organic fiber, wherein the organic fiber comprises a combination of two or more of a polyester, a polyethylene, a polyamide, an aramid, a polymethyl methacrylate, a polycarbonate, a cycloolefin, a fluoropolymer, and a carbon fiber.

Embodiment 148

The composite belt of embodiment 1, wherein the profile is attached to the belt by a stitching material, wherein the stitching material comprises a thread, wherein the thread comprises an organic fiber, wherein the organic fiber consists of a combination of two or more of a polyester, a polyethylene, a polyamide, an aramid, a polymethyl methacrylate, a polycarbonate, a cycloolefin, a fluoropolymer, and a carbon fiber.

Embodiment 149

The composite belt of embodiment 1, wherein the profile is attached to the belt by a stitching material, wherein the stitching material comprises a thread, wherein the thread comprises a composite fiber, wherein the composite fiber comprises a combination of mineral and organic fibers.

Embodiment 150

The composite belt of embodiment 1, wherein the profile is attached to the belt by a stitching material, wherein the stitching material comprises a thread, wherein the thread comprises a composite fiber, wherein the composite fiber consists of a combination of mineral and organic fibers.

Embodiment 151

The composite belt of embodiment 1, wherein the profile is attached to the belt by an adhesive.

Embodiment 152

The composite belt of embodiment 1, wherein the profile is attached to the belt by an adhesive, wherein the adhesive comprises a polymer.

Embodiment 153

The composite belt of embodiment 1, wherein the profile is attached to the belt by an adhesive, wherein the adhesive comprises an elastomer.

Embodiment 154

The composite belt of embodiment 1, wherein the profile is attached to the belt by an adhesive, wherein the adhesive comprises a silicone-based material.

Embodiment 155

The composite belt of embodiment 1, wherein the profile is attached to the belt by an adhesive, wherein the adhesive comprises a silicone-based polymer.

Embodiment 156

The composite belt of embodiment 1, wherein the profile is attached to the belt by an adhesive, wherein the adhesive comprises a polysiloxane.

Embodiment 157

The composite belt of embodiment 1, wherein the profile is attached to the belt by an adhesive, wherein the adhesive comprises a fluoropolymer.

Embodiment 158

The composite belt of embodiment 1, wherein the profile is attached to the belt by an adhesive, wherein the adhesive comprises a perfluoropolymer.

Embodiment 159

The composite belt of embodiment 1, wherein the profile is attached to the belt by an adhesive, wherein the adhesive comprises a polytetrafluoroethylene.

Embodiment 160

The composite belt of embodiment 1, wherein the profile is attached to the belt by an adhesive, wherein the adhesive comprises a food grade material.

Embodiment 161

The composite belt of embodiment 1, wherein the profile is attached to the belt by an adhesive, wherein the adhesive comprises a combination of two or more of a polymer, an elastomer, a silicone-based material, a silicone-based polymer, a polysiloxane, a fluoropolymer, a perfluoropolymer, a polytetrafluoroethylene, and a food grade material.

Embodiment 162

The composite belt of embodiment 1, wherein the profile comprises a surface attached to the belt by an adhesive, and wherein the surface attached to the belt is pre-treated by sodium etching.

Embodiment 163

The composite belt of embodiment 1, wherein the profile comprises a surface attached to the belt by an adhesive, and wherein the surface comprises a tie coat.

Embodiment 164

The composite belt of embodiment 1, wherein the profile comprises a surface attached to the belt by an adhesive, wherein the surface comprises a tie coat, and wherein the tie coat comprises a colloidal suspension, and wherein the colloidal suspension comprises silica.

Embodiment 165

The composite belt of embodiment 1, wherein the profile comprises a surface attached to the belt by an adhesive, wherein the surface comprises a tie coat, and wherein the tie coat comprises a polymer.

Embodiment 166

The composite belt of embodiment 1, wherein the profile comprises a surface attached to the belt by an adhesive, wherein the surface comprises a tie coat, and wherein the tie coat comprises a elastomer.

Embodiment 167

The composite belt of embodiment 1, wherein the profile comprises a surface attached to the belt by an adhesive, wherein the surface comprises a tie coat, and wherein the tie coat comprises a silicone-based material.

Embodiment 168

The composite belt of embodiment 1, wherein the profile comprises a surface attached to the belt by an adhesive, wherein the surface comprises a tie coat, and wherein the tie coat comprises a silicone-based polymer.

Embodiment 169

The composite belt of embodiment 1, wherein the profile comprises a surface attached to the belt by an adhesive, wherein the surface comprises a tie coat, and wherein the tie coat comprises a polysiloxane.

Embodiment 170

The composite belt of embodiment 1, wherein the profile comprises a surface attached to the belt by an adhesive, wherein the surface comprises a tie coat, and wherein the tie coat comprises a fluoropolymer.

Embodiment 171

The composite belt of embodiment 1, wherein the profile comprises a surface attached to the belt by an adhesive, wherein the surface comprises a tie coat, and wherein the tie coat comprises a perfluoropolymer.

Embodiment 172

The composite belt of embodiment 1, wherein the profile comprises a surface attached to the belt by an adhesive, wherein the surface comprises a tie coat, and wherein the tie coat comprises a polytetrafluoroethylene.

Embodiment 173

The composite belt of embodiment 1, wherein the profile comprises a surface attached to the belt by an adhesive, wherein the surface comprises a tie coat, and wherein the tie coat comprises a food grade material.

Embodiment 174

The composite belt of embodiment 1, wherein the profile comprises a surface attached to the belt by an adhesive, wherein the surface comprises a tie coat, and wherein the tie coat comprises a combination of two or more of a silica colloidal suspension, a polymer, an elastomer, a silicone-based material, a silicone-based polymer, a polysiloxane, a fluoropolymer, a perfluoropolymer, a polytetrafluoroethylene, and a food grade material.

Embodiment 175

The composite belt of embodiment 1, wherein the profile is attached to the belt by an adhesive, and wherein the surface is pre-treated by corona treatment.

Embodiment 176

The composite belt of embodiment 1, wherein the composite belt comprises not greater than 10 profiles or not greater than 9 profiles or not greater than 8 profiles or not greater than 7 profiles or not greater than 6 profiles or not greater than 5 profiles or not greater than 4 profiles or not greater than 3 profiles or not greater than 2 profiles.

Embodiment 177

The composite belt of embodiment 1, wherein the composite belt comprises at least 1 profile or at least 2 profiles or at least 3 profiles or at least 4 profiles or at least 5 profiles or at least 6 profiles or at least 7 profiles or at least 8 profiles or at least 9 profiles.

Embodiment 178

The composite belt of embodiment 1, wherein the composite belt comprises two profiles, wherein the belt has two edges, and wherein one profile is attached near each edge of the belt.

Embodiment 179

The composite belt of embodiment 1, wherein the composite belt comprises multiple profiles arranged to form a line.

Embodiment 180

The composite belt of embodiment 1, wherein the outer side edge of the profile is located at the edge of the belt.

Embodiment 181

The composite belt of embodiment 1, wherein the profile is a first profile, and wherein the composite belt comprises a second profile and a third profile, wherein the outer side edge of the first profile is located at a first edge of the belt, wherein the outer side edge of the second profile is located at a second edge of the belt opposite the first edge, and wherein the third profile is located between the first profile and the second profile.

Embodiment 182

The composite belt of embodiment 1, wherein the outer side edge of the profile is located on the belt at a distance of not greater than 50% of the width of the profile or not greater than 45% of the width of the profile or not greater than 40% of the width of the profile or not greater than 35% of the width of the profile or not greater than 30% of the width of the profile or not greater than 25% of the width of the profile or not greater than 20% of the width of the profile or not greater than 15% of the width of the profile or not greater than 10% of the width of the profile or not greater than 5% of the width of the profile from the edge of the belt.

Embodiment 183

The composite belt of embodiment 1, wherein the outer side edge of the profile is located on the belt at a distance of at least 1% of the width of the profile or at least 5% of the width of the profile or at least 10% of the width of the profile or at least 15% of the width of the profile or at least 20% of the width of the profile or at least 25% of the width of the profile or at least 30% of the width of the profile or at least 35% of the width of the profile or at least 40% of the width of the profile or at least 45% of the width of the profile from the edge of the belt.

Embodiment 184

The composite belt of embodiment 1, wherein the outer side edge of the profile is located past the edge of the belt at a distance of not greater than 50% of the width of the profile or not greater than 45% of the width of the profile or not greater than 40% of the width of the profile or not greater than 35% of the width of the profile or not greater than 30% of the width of the profile or not greater than 25% of the width of the profile or not greater than 20% of the width of the profile or not greater than 15% of the width of the profile or not greater than 10% of the width of the profile or not greater than 5% of the width of the profile from the edge of the belt.

Embodiment 185

The composite belt of embodiment 1, wherein the outer side edge of the profile is located past the edge of the belt at a distance of at least 1% of the width of the profile or at least 5% of the width of the profile or at least 10% of the width of the profile or at least 15% of the width of the profile or at least 20% of the width of the profile or at least 25% of the width of the profile or at least 30% of the width of the profile or at least 35% of the width of the profile or at least 40% of the width of the profile or at least 45% of the width of the profile from the edge of the belt.

Embodiment 186

The composite belt of embodiment 1, wherein the nodules are located to form a line in a longitudinal direction of the belt.

Embodiment 187

The composite belt of embodiment 1, wherein the belt forms a continuous loop, and wherein the nodules are located such that they form a continuous loop in a longitudinal direction of the belt.

Embodiment 188

The composite belt of embodiment 1, wherein the belt forms a continuous loop, wherein the profile comprises a first end and a second end, and wherein the profile is located on the belt such that the first end abuts the second end.

Embodiment 189

The composite belt of embodiment 1, wherein two nodules are located not greater than 500 mm apart, or not greater than 200 mm apart, or not greater than 100 mm apart, or not greater than 90 mm apart, or not greater than 80 mm apart, or not greater than 70 mm apart, or not greater than 65 mm apart, or not greater than 60 mm apart, or not greater than 55 mm apart, or not greater than 50 mm apart, or not greater than 45 mm apart, or not greater than 40 mm apart, or not greater than 35 mm apart, or not greater than 30 mm apart, or not greater than 25 mm apart, or not greater than 20 mm apart or not greater than 15 mm apart or not greater than 10 mm apart or not greater than 5 mm apart in a longitudinal direction of the belt.

Embodiment 190

The composite belt of embodiment 1, wherein two nodules are located at least 1 mm apart or at least 5 mm apart or at least 10 mm apart or at least 15 mm apart or at least 20 mm apart, or at least 25 mm apart, or at least 30 mm apart, or at least 35 mm apart, or at least 40 mm apart, or at least 45 mm apart, or at least 50 mm apart, or at least 55 mm apart, or at least 60 mm apart, or at least 65 mm apart, or at least 70 mm apart, or at least 80 mm apart, or at least 90 mm apart, or at least 100 mm apart, or at least 200 mm apart in a longitudinal direction of the belt.

Embodiment 191

The composite belt of embodiment 1, wherein two nodules are located within a range of 90 mm apart to 100 mm apart, or within a range of 80 mm apart to 90 mm apart, or within a range of 70 mm apart to 80 mm apart, or within a range of 65 mm apart to 70 mm apart, or within a range of 60 mm apart to 65 mm apart, or within a range of 55 mm apart to 60 mm apart, or within a range of 50 mm apart to 55 mm apart, or within a range of 45 mm apart to 50 mm apart, or within a range of 40 mm apart to 45 mm apart, or within a range of 35 mm apart to 40 mm apart, or within a range of 30 mm apart to 35 mm apart, or within a range of 25 mm apart to 30 mm apart, or within a range of 20 mm apart to 25 mm apart, or within a range of 15 mm apart to 20 mm apart, or within a range of 10 mm apart to 15 mm apart, or within a range of 5 mm apart to 10 mm apart, or within a range of 1 mm apart to 5 mm apart.

Embodiment 192

The composite belt of embodiment 1, wherein the composite belt is adapted to withstand a temperature of not greater than 400 degrees Celsius or not greater than 380 degrees Celsius or not greater than 360 degrees Celsius or not greater than 340 degrees Celsius or not greater than 320 degrees Celsius or not greater than 300 degrees Celsius or not greater than 280 degrees Celsius or not greater than 260 degrees Celsius or not greater than 240 degrees Celsius or not greater than 220 degrees Celsius or not greater than 200 degrees Celsius or not greater than 180 degrees Celsius or not greater than 160 degrees Celsius.

Embodiment 193

The composite belt of embodiment 1, wherein the composite belt is adapted to withstand a temperature of at least 140 degrees Celsius or at least 160 degrees Celsius or at least 180 degrees Celsius or at least 200 degrees Celsius or at least 220 degrees Celsius or at least 240 degrees Celsius or at least 260 degrees Celsius or at least 280 degrees Celsius or at least 300 degrees Celsius or at least 320 degrees Celsius or at least 340 degrees Celsius or at least 360 degrees Celsius or at least 380 degrees Celsius.

Embodiment 194

A cooking apparatus comprising: a housing; a heat source; a drive roller; and a composite belt; wherein the composite belt comprises: a profile; and a belt; wherein the profile comprises a strip; and nodules; and wherein the profile is attached to the belt such that each nodule extends out from the belt.

Embodiment 195

The cooking apparatus of embodiment 194, wherein the drive roller comprises a drive chain.

Embodiment 196

The cooking apparatus of embodiment 194, wherein the composite belt is oriented to convey an object downward in the direction of gravity.

Embodiment 197

The cooking apparatus of embodiment 194, wherein the composite belt is oriented to convey an object horizontally in a direction perpendicular to the direction of gravity.

Embodiment 198

The cooking apparatus of embodiment 194, wherein a nodule is engaged with an aperture in the drive roller.

Embodiment 199

The cooking apparatus of embodiment 194, wherein the nodules are configured to maintain the belt in alignment.

Embodiment 200

The cooking apparatus of embodiment 194, wherein the nodules are configured to rotate the belt.

Embodiment 201

The cooking apparatus of embodiment 194, wherein the distance between two nodules in a longitudinal direction is the radial distance between a first aperture in the drive roller and a second aperture in the drive roller.

Embodiment 202

The cooking apparatus of embodiment 194, wherein the cooking apparatus comprises a second composite belt.

Embodiment 203

The cooking apparatus of embodiment 194, wherein the cooking apparatus comprises a second heat source.

Embodiment 204

The cooking apparatus of embodiment 194, wherein the heat source is a first heat source, wherein the cooking apparatus comprises a second heat source, wherein the first heat source heats a first surface of the composite belt, and wherein the second heat source heats a second surface of the composite belt opposite the first surface.

Embodiment 205

The cooking apparatus of embodiment 194, wherein the composite belt is a first composite belt, wherein the cooking apparatus comprises a second composite belt, and wherein the first composite belt is adjacent to the second composite belt.

Embodiment 206

The cooking apparatus of embodiment 194, wherein the composite belt is a first composite belt, wherein the cooking apparatus comprises a second composite belt, wherein the first composite belt is opposite the second composite belt.

Embodiment 207

The cooking apparatus of embodiment 194, wherein the composite belt is a first composite belt, wherein the cooking apparatus comprises a second composite belt, wherein the first composite belt is opposite the second composite belt, and wherein there is a gap between the first composite belt and the second composite belt.

Embodiment 208

The cooking apparatus of embodiment 194, wherein the composite belt is a first composite belt, wherein the cooking apparatus comprises a second composite belt, a third composite belt, and a fourth composite belt, wherein the first composite belt is opposite the fourth composite belt such that a first gap exists between the first composite belt and the fourth composite belt, wherein the second composite belt is opposite the fourth composite belt such that a second gap exists between the second composite belt and the fourth composite belt, wherein the third composite belt is opposite the fourth composite belt such that a third gap exists between the third composite belt and the fourth composite belt, wherein a length of the first gap is different than a length of the second gap, and wherein a length of the second gap is different than a length of the third gap.

Embodiment 209

A profile comprising: a strip; and nodules; wherein the strip comprises an upper surface and a lower surface, wherein the nodules are located along a line upon the upper surface, and wherein each nodule comprises: a lower region adjacent the strip, the lower region having a first diameter; and an upper region adjacent the lower region, the upper region having a second diameter; wherein the first diameter is less than the second diameter.

The foregoing embodiments represent a departure from the state-of-the-art. Notably, the composite belt and cooking apparatus embodiments described herein include a combination of features not previously recognized in the art and facilitate performance improvements. Such features can include, but are not limited to, the use of a profile, selection of materials, particular configurations and dimensions of the nodules and the profile, particular methods of attaching the profile to the belt, and particular configurations of the composite belt as part of a cooking apparatus. The composite belt and cooking apparatus embodiments described herein have demonstrated remarkable and unexpected improvements over state-of-the-art composite belts and cooking apparatuses. In particular, they have shown improved heat stability, food grade componentry, durability, ease of manufacture, and ease of use.

Note that not all of the activities described above in the general description are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A cooking apparatus comprising:
   a housing;
   a heat source;
   a drive roller; and
   a composite belt;
   wherein the composite belt comprises:
      a profile; and
      a belt;
   wherein the profile comprises
      a strip; and
      nodules; and
   wherein the profile is attached to the belt such that each nodule extends out from the belt.

2. The cooking apparatus of claim 1, wherein the drive roller comprises a drive chain.

3. The cooking apparatus of claim 1, wherein the belt is oriented to convey an object downward in the direction of gravity.

4. The cooking apparatus of claim 1, wherein the belt is oriented to convey an object horizontally in a direction perpendicular to the direction of gravity.

5. The cooking apparatus of claim 1, wherein a nodule is engaged with an aperture in the drive roller.

6. The cooking apparatus of claim 1, wherein the nodules are configured to maintain the belt in alignment.

7. The cooking apparatus of claim 1, wherein the nodules are configured to rotate the belt.

8. The cooking apparatus of claim 1, wherein the distance between two nodules in a longitudinal direction is the radial distance between a first aperture in the drive roller and a second aperture in the drive roller.

9. The cooking apparatus of claim 1, wherein the cooking apparatus comprises a second composite belt.

10. The cooking apparatus of claim 1, wherein the cooking apparatus comprises a second heat source.

11. The cooking apparatus of claim 1, wherein the heat source is a first heat source, wherein the cooking apparatus comprises a second heat source, wherein the first heat source heats a first surface of the composite belt, and wherein the second heat source heats a second surface of the composite belt opposite the first surface.

12. The cooking apparatus of claim 1, wherein the composite belt is a first composite belt, wherein the cooking apparatus comprises a second composite belt, and wherein the first composite belt is adjacent to the second composite belt.

13. The cooking apparatus of claim 1, wherein the composite belt is a first composite belt, wherein the cooking apparatus comprises a second composite belt, wherein the first composite belt is opposite the second composite belt.

14. The cooking apparatus of claim 1, wherein the composite belt is a first composite belt, wherein the cooking apparatus comprises a second composite belt, wherein the first composite belt is opposite the second composite belt, and wherein there is a gap between the first composite belt and the second composite belt.

15. The cooking apparatus of claim 1, wherein the composite belt is a first composite belt, wherein the cooking apparatus comprises a second composite belt, a third composite belt, and a fourth composite belt, wherein the first composite belt is opposite the fourth composite belt such that a first gap exists between the first composite belt and the fourth composite belt, wherein the second composite belt is opposite the fourth composite belt such that a second gap exists between the second composite belt and the fourth composite belt, wherein the third composite belt is opposite the fourth composite belt such that a third gap exists between the third composite belt and the fourth composite belt, wherein the first gap is different than the second gap, and wherein the second gap is different than the third gap.

16. The cooking apparatus of claim 1, wherein the profile comprises a polymer, an elastomer, a silicone-based material, a silicone-based polymer, a polysiloxane, a fluoropolymer, a perfluoropolymer, a polytetrafluoroethylene, or a food grade material.

17. The cooking apparatus of claim 1, wherein the profile comprises a combination of two or more of a polymer, an elastomer, a silicone-based material, a silicone-based polymer, a polysiloxane, a fluoropolymer, a perfluoropolymer, a polytetrafluoroethylene, and a food grade material.

18. The cooking apparatus of claim 1, wherein the strip has a width of not greater than 5 cm and at least 0.1 cm.

19. The cooking apparatus of claim 1, wherein each nodule protrudes through the belt.

20. The cooking apparatus of claim 1, wherein the profile comprises a surface adjacent the nodules, and wherein the profile is attached to the belt at the surface adjacent the nodules.

* * * * *